(12) United States Patent
Madsen et al.

(10) Patent No.: US 10,862,222 B2
(45) Date of Patent: *Dec. 8, 2020

(54) PHASED ARRAY CONTROL CIRCUIT

(71) Applicant: Anokiwave, Inc., San Anselmo, CA (US)

(72) Inventors: Kristian N. Madsen, Napa, CA (US); Wade C. Allen, San Diego, CA (US); Jonathan P. Comeau, San Diego, CA (US); Robert J. Mcmorrow, Concord, MA (US); David W. Corman, Gilbert, AZ (US); Nitin Jain, San Diego, CA (US); Robert Ian Gresham, San Diego, CA (US); Gaurav Menon, San Marcos, CA (US); Vipul Jain, Irvine, CA (US)

(73) Assignee: Anokiwave, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,116

(22) Filed: Jun. 10, 2019

(65) Prior Publication Data

US 2019/0312359 A1 Oct. 10, 2019

Related U.S. Application Data

(63) Continuation of application No. 15/253,426, filed on Aug. 31, 2016, now Pat. No. 10,320,093.

(51) Int. Cl.
*H04B 1/38* (2015.01)
*H01Q 21/22* (2006.01)
(Continued)

(52) U.S. Cl.
CPC ............ *H01Q 21/22* (2013.01); *H01Q 3/24* (2013.01); *H01Q 3/26* (2013.01)

(58) Field of Classification Search
CPC ............ H01Q 21/22; H01Q 3/24; H01Q 3/26; H04W 52/00; H04W 52/02; H04W 52/028

See application file for complete search history.

(56) References Cited

U.S. PATENT DOCUMENTS

| 5,027,126 A | 6/1991 | Basehgi et al. |
| 5,448,250 A | 9/1995 | Day |

(Continued)

FOREIGN PATENT DOCUMENTS

| JP | 2007178332 A | 7/2007 |
| JP | 2014036325 A | 2/2014 |
| WO | WO-2017/078851 | 5/2017 |

OTHER PUBLICATIONS

Bailey, "General Layout Guidelines for RF and Mixed-Signal PCBs," Maxim Integrated, Tutorial 5100, 10 pages, Sep. 14, 2011.

(Continued)

*Primary Examiner* — Tuan Pham
(74) *Attorney, Agent, or Firm* — Nutter McClennen & Fish LLP

(57) ABSTRACT

In certain exemplary embodiments, register banks are used to allow for fast beam switching (FBS) in a phased array system. Specifically, each beam forming channel is associated with a register bank containing M register sets for configuring such things as gain/amplitude and phase parameters of the beam forming channel. The register banks for all beam forming channels can be preprogrammed and then fast beam switching circuitry allows all beam forming channels across the array to be switched to use the same register set from its corresponding register bank at substantially the same time, thereby allowing the phased array system to be quickly switched between various beam patterns and orientations. Additionally or alternatively, active power control circuitry may be used to control the amount of electrical (Continued)

power provided to or consumed by one or more individual beam forming channels such as to reduce DC power consumption of the array and/or to selectively change the effective directivity of the array.

18 Claims, 26 Drawing Sheets

(51) Int. Cl.
*H01Q 3/26* (2006.01)
*H01Q 3/24* (2006.01)

(56) References Cited

U.S. PATENT DOCUMENTS

| | | | |
|---|---|---|---|
| 5,724,666 | A | 3/1998 | Dent |
| 5,920,278 | A | 7/1999 | Tyler et al. |
| 6,266,528 | B1 | 7/2001 | Farzaneh |
| 7,087,993 | B2 | 8/2006 | Lee |
| 7,129,568 | B2 | 10/2006 | Lee et al. |
| 8,558,398 | B1 | 10/2013 | Seetharam |
| 8,866,283 | B2 | 10/2014 | Chen et al. |
| 9,445,157 | B2 | 9/2016 | Barrett |
| 10,320,093 | B2 * | 6/2019 | Madsen ............... H01Q 3/26 |
| 2002/0070895 | A1 | 6/2002 | Vail et al. |
| 2005/0017352 | A1 | 1/2005 | Lee |
| 2005/0082645 | A1 | 4/2005 | Lee et al. |
| 2005/0098860 | A1 | 5/2005 | Lai et al. |
| 2005/0130595 | A1 | 6/2005 | Shurvinton et al. |
| 2006/0006505 | A1 | 1/2006 | Chiang et al. |
| 2008/0007453 | A1 | 1/2008 | Vassilakis et al. |
| 2008/0268790 | A1 * | 10/2008 | Shi ..................... H01Q 3/267 |
| | | | 455/73 |
| 2009/0256752 | A1 | 10/2009 | Akkermans et al. |
| 2010/0210219 | A1 | 8/2010 | Stirling-Gallacher et al. |
| 2011/0198742 | A1 | 8/2011 | Danno et al. |
| 2011/0306383 | A1 * | 12/2011 | Lee ..................... H04W 72/02 |
| | | | 455/522 |
| 2012/0313219 | A1 | 12/2012 | Chen et al. |
| 2013/0050055 | A1 | 2/2013 | Paradiso et al. |
| 2013/0187830 | A1 | 7/2013 | Warnick et al. |
| 2014/0210667 | A1 | 7/2014 | Wang et al. |
| 2014/0210668 | A1 | 7/2014 | Wang et al. |
| 2014/0348035 | A1 | 11/2014 | Corman et al. |
| 2016/0248157 | A1 | 8/2016 | Rao et al. |
| 2016/0359203 | A1 * | 12/2016 | Schmiegel ............ H01M 10/44 |
| 2016/0359230 | A1 | 12/2016 | Wang et al. |
| 2017/0230094 | A1 | 8/2017 | Da Silva et al. |
| 2017/0237180 | A1 | 8/2017 | Corman et al. |
| 2017/0311179 | A1 | 10/2017 | Fujio |
| 2018/0019517 | A1 | 1/2018 | Allen et al. |

OTHER PUBLICATIONS

Maxim, 5GHz, 4-Channel MIMO Transmitter, MAX2850, Maxim Integrated Products, Inc., 33 pages, 2010.
Silicon Labs "Layout Design Guide for the Si4455/435x RF ICs," AN685, Silicon Laboratories, 22 pages, 2014.
International Search Report and Written Opinion for International Application No. PCT/US2016/052215, dated May 29, 2017 (17 pages).
International Search Report and Written Opinion for International Application No. PCT/US2017/042311, dated Oct. 30, 2017 (9 pages).
International Search Report and Written Opinion for International Application No. PCT/US2017/048913, dated Jan. 11, 2018 (14 pages).
Ismail M., "Introduction to RF CMOS IC Design for Wireless Applications," Analog VLSI Lab, The Ohio State University, 117 pages, Nov. 2001.
Jain S., "Layout Review Techniques for Low Power RF Designs," Application Note AN098, Texas Instruments, 15 pages, Jun. 5, 2011.
European Patent Office, Alexander Ganis, Examiner, Extended European Search Report for Application No. EP 17847311, 25 Pages, dated Feb. 6, 2020.
Japanese Patent Office, Office Action for Application No. 2019-512673 with English summary, 8 pages, dated Feb. 6, 2020.
Chinese Patent Office, Office Action for Application No. 201780052716.8, 26 Pages, dated Jul. 3, 2020.

* cited by examiner (A)

(B)

| PWR | MODE | PHASE | GAIN |

| Register Set | FIG. 23(A) | FIG. 23(B) | FIG. 23(C) |
|---|---|---|---|
| A | 2 → | 17 → | 15 |
| B | 3 → | 18 | 18 |
| C | 4 → | 19 | 19 |
| D | 7 | 7 → | 20 |
| E | 8 | 8 → | 23 |
| F | 9 | 9 → | 24 |
| G | 12 | 12 → | 25 |
| H | 13 | 13 | 13 |
| I | 14 | 14 | 14 |

FIG. 24

PHASED ARRAY CONTROL CIRCUIT

CROSS-REFERENCE TO RELATED APPLICATION(S)

This patent application is a continuation of, and therefore claims priority from, U.S. patent application Ser. No. 15/253,426 entitled PHASED ARRAY CONTROL CIRCUIT filed Aug. 31, 2016 (U.S. Pat. No. 10,320,093 issued Jun. 11, 2019), which is hereby incorporated herein by reference in its entirety.

FIELD OF THE INVENTION

The invention generally relates to phased arrays and, more particularly, the invention relates to a phased array control circuit.

BACKGROUND OF THE INVENTION

Active electronically steered antenna systems ("AESA systems," a type of "phased array system") form electronically steerable beams for a wide variety of radar and communications systems. To that end, AESA systems typically have a plurality of beam forming elements (e.g., antennas) that transmit and/or receive energy so that the signal on each beam forming element can be coherently (i.e., in-phase and amplitude) combined (referred to herein as "beam forming" or "beam steering"). Specifically, many AESA systems implement beam steering by providing a unique RF phase shift and gain setting (phase and gain together constitute a complex beam weight) between each beam forming element and a beamforming or summation point.

The number and type of beam forming elements in the phased array system can be selected or otherwise configured specifically for a given application. A given application may have a specified minimum equivalent/effective isotropically radiated power ("EIRP") for transmitting signals. Additionally, or alternatively, a given application may have a specified minimum G/T (analogous to a signal-to-noise ratio) for receiving signals, where:

G denotes the gain or directivity of an antenna, and

T denotes the total noise temperature of the receive system including receiver noise figure, sky temperature, and feed loss between the antenna and input low noise amplifier.

SUMMARY OF VARIOUS EMBODIMENTS

In accordance with one embodiment of the invention, a phased array system comprises a plurality of beam forming elements; a plurality of beam forming channels, each beam forming channel including beam forming circuitry configured to process signals for a discrete beam forming element; and for each beam forming channel, a corresponding register bank comprising a plurality of addressable and programmable register sets and fast beam switching circuitry that receives fast beam switching control signals from a fast beam switching control interface, each register set configured to store operating parameters for the beam forming channel, the fast beam switching circuitry configured to provide operating parameters from a selected one of the register sets to the beam forming channel based on the fast beam switching control signals from the fast beam switching control interface.

In accordance with another embodiment of the invention, a beam forming integrated circuit for use in a phased array system comprises at least one beam forming channel, each beam forming channel including beam forming circuitry configured to process signals for a discrete beam forming element; and for each beam forming channel, a corresponding register bank comprising a plurality of addressable and programmable register sets and fast beam switching circuitry that receives fast beam switching control signals from a fast beam switching control interface, each register set configured to store operating parameters for the beam forming channel, the fast beam switching circuitry configured to provide operating parameters from a selected one of the register sets to the beam forming channel based on the fast beam switching signals from the fast beam switching control interface.

In various alternative embodiments, the fast beam switching circuitry may be configured to allow for random access to the register sets, sequential access to the register sets, and/or round-robin access to the register sets. A programming interface may be included for programming the register banks. The fast beam switching control interface may be part of the programming interface or may be separate from the programming interface. The fast beam switching circuitry may be configured to select the register set based on a parallel address or based on a clock signal. The operating parameters may include an amplitude parameter and a phase parameter. At least one of the beam forming channels may be a dual-mode beam forming channel including transmit path circuitry for operating in a transmit mode, receive path circuitry for operating in a receive mode, and mode selection circuitry for switching between the transmit mode and the receive mode based on a mode selection parameter in the operating parameters for the beam forming channel. At least one beam forming channel may include active power control circuitry configured to selectively control DC power consumption of the beam forming channel based on a power control parameter for the beam forming channel for at least one of (1) reducing DC power consumption of the phased array system or (2) selectively changing the effective directivity of the phased array system. The power control parameter for the beam forming channel may be derived from the operating parameters provided to the beam forming channel and/or from a register separate from the register bank. The active power control circuitry may be configured to selectively turn on and off at least some beam forming circuitry of the beam forming channel and/or to selectively adjust a power level of at least some beam forming circuitry of the beam forming channel. A phased array system may include a plurality of beam forming integrated circuits, each beam forming integrated circuit implementing at least one beam forming channel and corresponding register bank. The register banks may include a sufficient number of register sets for being preprogrammed with parameters for beams covering a full 2D scan volume of the phased array system.

In accordance with another embodiment of the invention, a phased array system comprises a plurality of beam forming elements and a plurality of beam forming channels, each beam forming channel including beam forming circuitry configured to process signals for a discrete beam forming element, wherein at least one beam forming channel further includes active power control circuitry configured to selectively control DC power consumption of the beam forming channel based on a power control parameter for the beam forming channel for at least one of (1) reducing DC power consumption of the phased array system or (2) selectively changing the effective directivity of the phased array system.

In accordance with another embodiment of the invention, a beam forming integrated circuit for use in a phased array system comprises at least one beam forming channel, each beam forming channel including beam forming circuitry configured to process signals for a discrete beam forming element, wherein at least one beam forming channel further includes active power control circuitry configured to selectively control DC power consumption of the beam forming channel based on a power control parameter for the beam forming channel for at least one of (1) reducing DC power consumption of the phased array system or (2) selectively changing the effective directivity of the phased array system.

In various alternative embodiments, each beam forming channel may include at least one register set for providing operating parameters to the beam forming channel, in which case the power control parameter for the beam forming channel may be derived from such operating parameters or may be provided via at least one power control register separate from such register sets. The active power control circuitry may be configured to selectively turn on and off at least some beam forming circuitry of the beam forming channel and/or to selectively adjust a power level of at least some beam forming circuitry of the beam forming channel.

In accordance with another embodiment, a beam forming method comprises preconfiguring a plurality of register sets in each of a plurality of register banks with parameters for beams covering a full 2D scan volume of a phased array system; selecting a register set for a beam forming operation; and sending fast beam switching control signals to activate the selected register set across the plurality of register banks for performing the beam forming operation.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 13 schematically shows the contents of a beam forming control codeword for controlling a beam forming channel, in accordance with certain embodiments.

FIG. 24 schematically shows exemplary register set configurations for the example of FIG. 23, in accordance with certain embodiments.

It should be noted that the foregoing figures and the elements depicted therein are not necessarily drawn to consistent scale or to any scale. Unless the context otherwise suggests, like elements are indicated by like numerals.

DESCRIPTION OF ILLUSTRATIVE EMBODIMENTS

Definitions

As used in this description and the accompanying claims, the following terms shall have the meanings indicated, unless the context otherwise requires:

A "set" includes one or more members.

A "beam forming element" (sometimes referred to simply as an "element") is an element that is used to transmit and/or receive a signal for beam forming. Different types of beam forming elements can be used for different beam forming applications. For example, the beam forming elements may be RF antennas for RF applications (e.g., radar, wireless communication system such as 5G applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals.

For convenience, the term "beam forming" is sometimes abbreviated herein as "BF."

In certain exemplary embodiments, register banks are used to allow for fast beam switching (FBS) in a phased array system. Specifically, each beam forming channel is associated with a register bank containing M register sets for configuring such things as gain/amplitude and phase parameters of the beam forming channel. The register banks for all beam forming channels can be preprogrammed and then fast beam switching circuitry allows all beam forming channels across the array to be switched to use the same register set from its corresponding register bank at substantially the same time, thereby allowing the phased array system to be quickly switched between various beam patterns and orientations. Additionally or alternatively, active power control circuitry may be used to control the amount of electrical power provided to or consumed by one or more individual beam forming channels (e.g., powering off circuitry in unneeded beam forming channels or reducing power to certain beam forming channels) such as to reduce DC power consumption of the array and/or to selectively change the effective directivity of the array. In some embodiments, fast beam switching and active power control may be used together, e.g., with power control parameters set through the fast beam switching circuitry or by separate circuitry.

Figure 1:
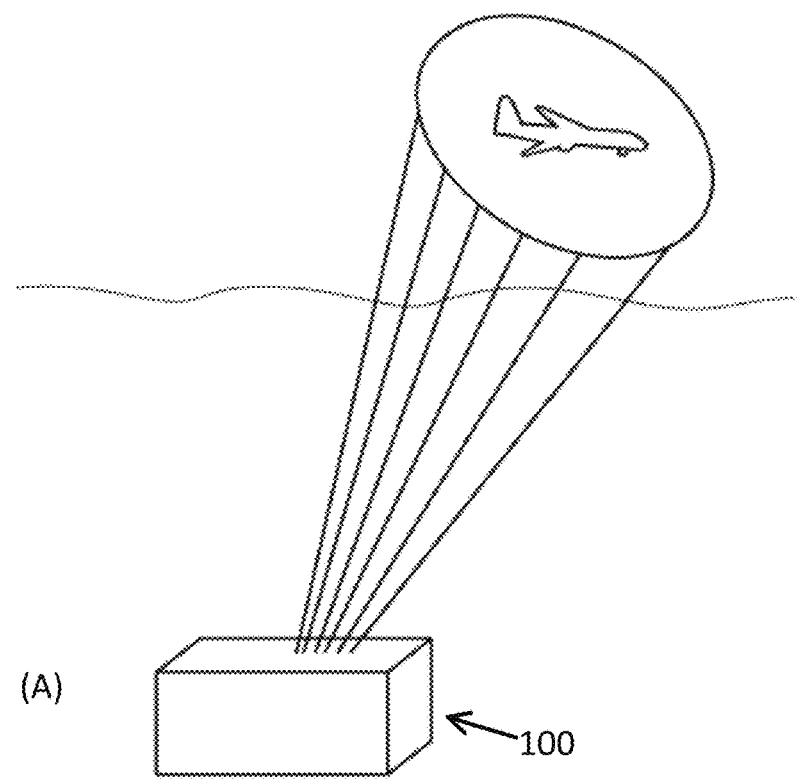
FIG. 1 schematically shows one exemplary application of a phased array system that may be configured in accordance with illustrative embodiments of the invention.
Figure 1:
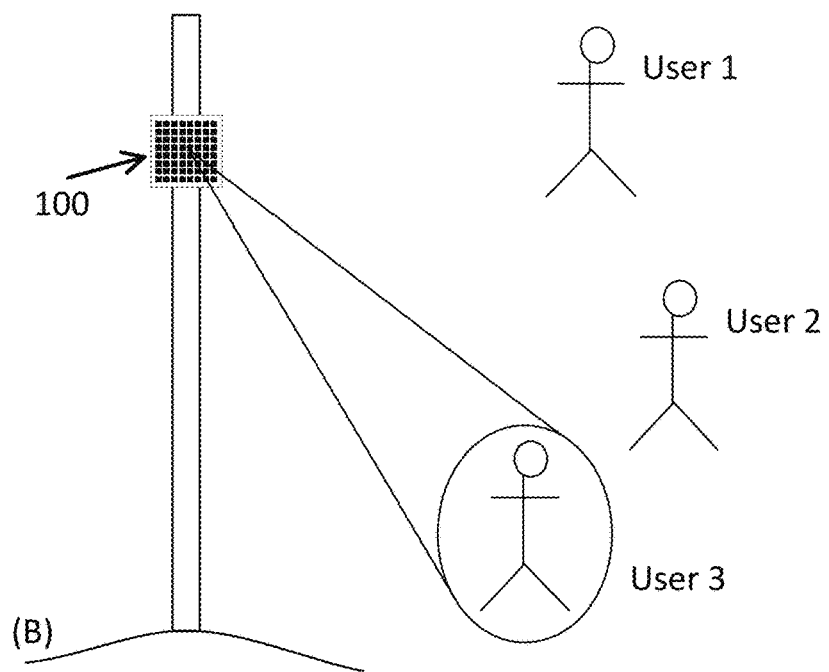

FIG. 1 schematically shows two exemplary applications of phased array systems 100 that may be configured in accordance with illustrative embodiments of the invention. In these examples, the phased array systems 100 implement AESA systems (also identified by reference number "100"), which, as known by those skilled in the art, form a plurality of electronically steerable beams that can be used for a wide variety of applications. For example, the application in FIG. 1(A) is implemented as a radar system in which a beam-formed signal may be directed toward an aircraft or other object in the sky (e.g., to detect or track position of the object), while the application in FIG. 1(B) is implemented as a wireless communication system (e.g., 5G) in which a beam-formed signal may be directed toward a particular user (e.g., to increase the effective transmit range of the AESA system or to allow for greater frequency reuse across adjacent or nearby cells. Of course, those skilled in the art use AESA systems 100 and other phased array systems 100 in a wide variety of other applications, such as RF communication, optics, sonar, ultrasound, etc. Accordingly, discussion of radar and wireless communication systems are not intended to limit all embodiments of the invention.

Figure 2:
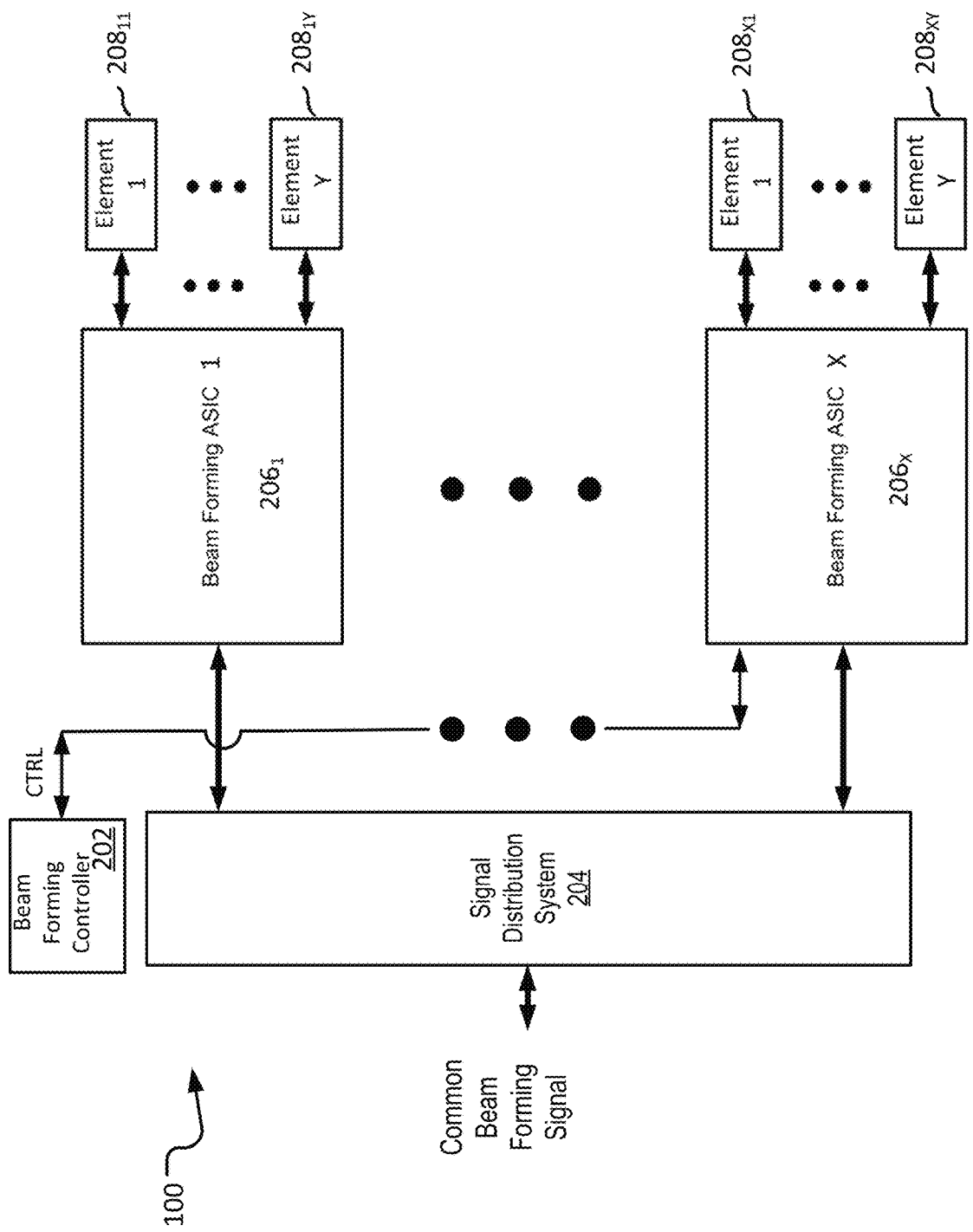
FIG. 2 is a schematic block diagram of the phased array system of FIG. 1, in accordance with certain exemplary embodiments.

FIG. 2 is a schematic block diagram of the phased array system 100 of FIG. 1, in accordance with certain exemplary embodiments. Among other things, the phased array system 100 includes a beam forming controller 202, a signal distribution system 204, and a number of beam forming integrated circuits (ASICs) 206, each of which supports a number of beam forming elements 208 (e.g., RF antennas for operation in the exemplary radar or 5G system). The phased array system 100 includes X beam forming ASICS 206, with each beam forming ASIC 206 supporting Y beam forming elements. Thus, the phased array system 100 includes (X*Y) beam forming elements.

The phased array system 100 of FIG. 2 can be used for transmitting a beam-formed signal via the beam forming elements 208 and/or to produce a beam-formed signal via the beam forming elements 208. Thus, the signal distribution system 204 may be configured to distribute the beam forming signal to each of the beam forming ASICs 206 and/or to produce a combined beam-formed signal from signals received from the beam forming ASICs 206.

Figure 3:
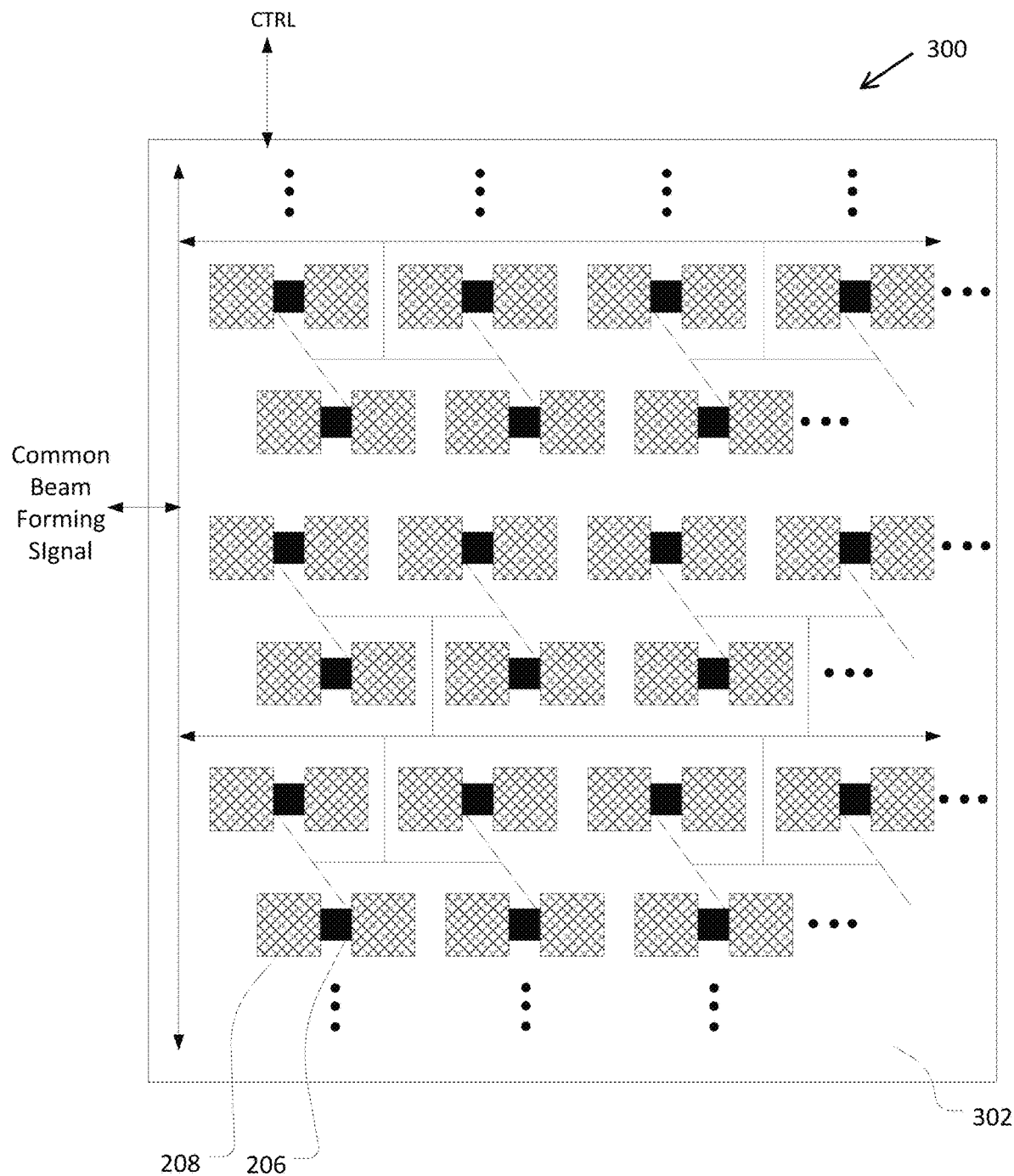
FIG. 3 is a schematic block diagram of a portion of a phased array system configured in accordance with certain illustrative embodiments.

FIG. 3 is a schematic block diagram of a portion 300 of a phased array system 100 configured in accordance with certain illustrative embodiments. Specifically, the portion 300 is implemented as a laminar phased array having a printed circuit board 302 (i.e., a base or substrate) supporting a plurality of beam forming ASICs 206 (represented by the solid black boxes), beam forming elements 208 (represented by the hatched boxes, e.g., RF antennas), and interconnection logic for coupling the beam forming ASICs 206 to the common beam forming signal line(s) and the common control (CTRL) line(s).

In this example, the beam forming elements 208 are formed as a plurality of patch antennas on the laminar printed circuit board 302, although it should be noted that the present invention is not limited to patch antennas or to a laminar printed circuit board. In this example, each beam forming ASIC 206 supports two beam forming elements (e.g., antennas), although in various alternative embodiments, each beam forming ASIC 206 may support one, two, or more beam forming elements (e.g., four beam forming elements per beam forming ASIC). Although only a small number of beam forming ASICs 206 and beam forming elements 208 are shown in the portion 300 of FIG. 3, it should be noted that various alternative embodiments may be configured such that the portion 300 includes a smaller number of beam forming ASICs 206 and/or beam forming elements 208 or may be configured such that the portion 300 includes a larger number of beam forming ASICs 206 and/or beam forming elements 208 (e.g., hundreds or even thousands, of beam forming elements 208). It should be noted that alternative embodiments may be implemented with just the beam forming elements 208 on the printed circuit board

302. It also should be noted that alternative embodiments may be implemented with the beam forming controller 202 and/or the RF power distribution 204 system on the printed circuit board 302.

The phased array system 100 can have any of a variety of different types of beam forming elements 208. For example, the phased array system 100 can have one or more transmit-only elements, one or more receive-only elements, and/or one or more dual-mode elements that are capable of both transmitting and receiving signals. For convenience, a beam forming channel that supports a dual-mode beam forming elements may be referred to herein as a "dual-mode beam forming channel" (sometimes also referred to as a "beam forming transceiver channel"). Embodiments typically include all the same type of beam forming element, i.e., either all transmit-only elements, all receive-only elements, or all dual-mode elements, and, furthermore, embodiments that include dual-mode elements typically operate all of the dual-mode elements in the same mode at any given time (e.g., transmit during one phase of operation, receive during another phase of operation, e.g., alternating between transmit and receive modes). However, embodiments may include both transmit-only elements and receive-only elements, in which case it is typical for the transmit-only elements to be operated during one phase of operation and for the receive-only elements to be operated during another phase of operation (e.g., alternating between transmit and receive modes). In some embodiments, transmit and receive modes can operate simultaneously, e.g., having both transmit-only and receive-only elements operating at the same time, or simultaneously having some dual-mode elements configured to transmit and some dual-mode elements configured to receive. The beam forming controller 202 controls the mode and operation of the beam forming ASICs 206 and beam forming elements 208.

As discussed above, each beam forming ASIC 206 supports one or more of the beam forming elements 208. In illustrative embodiments, each beam forming ASIC 206 is configured with at least the minimum number of functions to accomplish the desired effect. Indeed, beam forming ASICs for use with dual-mode elements typically have some different functionality than that of beam forming ASICs for use with transmit-only or receive-only elements. For example, beam forming ASICs for use with dual-mode elements typically include switching circuitry for switching each dual-mode element between a transmitter and a receiver. Accordingly, beam forming ASICs for use with transmit-only or receive-only elements typically have a smaller footprint than beam forming ASICs for use with dual-mode elements.

As an example, depending on its role in the configuration of the phased array system 100, each beam forming ASICs 206 may include some or all of the following functions:
  phase shifting,
  amplitude controlling/signal weighting,
  switching between transmit mode and receive mode,
  output amplification to amplify output signals to the beam forming element(s),
  input amplification to amplify input signals from the beam forming element(s), and
  power combining and splitting between beam forming elements.

Indeed, some embodiments of the beam forming ASICs 206 may have additional or different functionality, although illustrative embodiments are expected to operate satisfactorily with the above noted functions. Those skilled in the art can configure the beam forming ASICs 206 in any of a wide variety of manners to perform those functions. For example, output amplification may be performed by a power amplifier, input amplification may be performed by a low noise amplifier, phase shifting may use conventional phase shifters, and switching functionality may be implemented using conventional transistor-based switches.

Each beam forming ASIC 206 preferably operates on at least one beam forming element 208 in the array. In certain exemplary embodiments, one beam forming ASIC 206 can operate on multiple beam forming elements 208, e.g., two or four beam forming elements 208. Of course, those skilled in the art can adjust the number of beam forming elements 208 sharing a beam forming ASIC 206 based upon the application. Among other things, sharing the beam forming ASICs 206 between multiple beam forming elements 208 in this manner generally reduces the required total number of beam forming ASICs 206, which in some cases may reduce the required size of the printed circuit board 302 (or in some cases allow a greater number of beam forming elements to be placed on the printed circuit board 302), reduce the power consumption of the phased array system 100, and reduce the overall cost of the phased array system 100.

Figure 4:
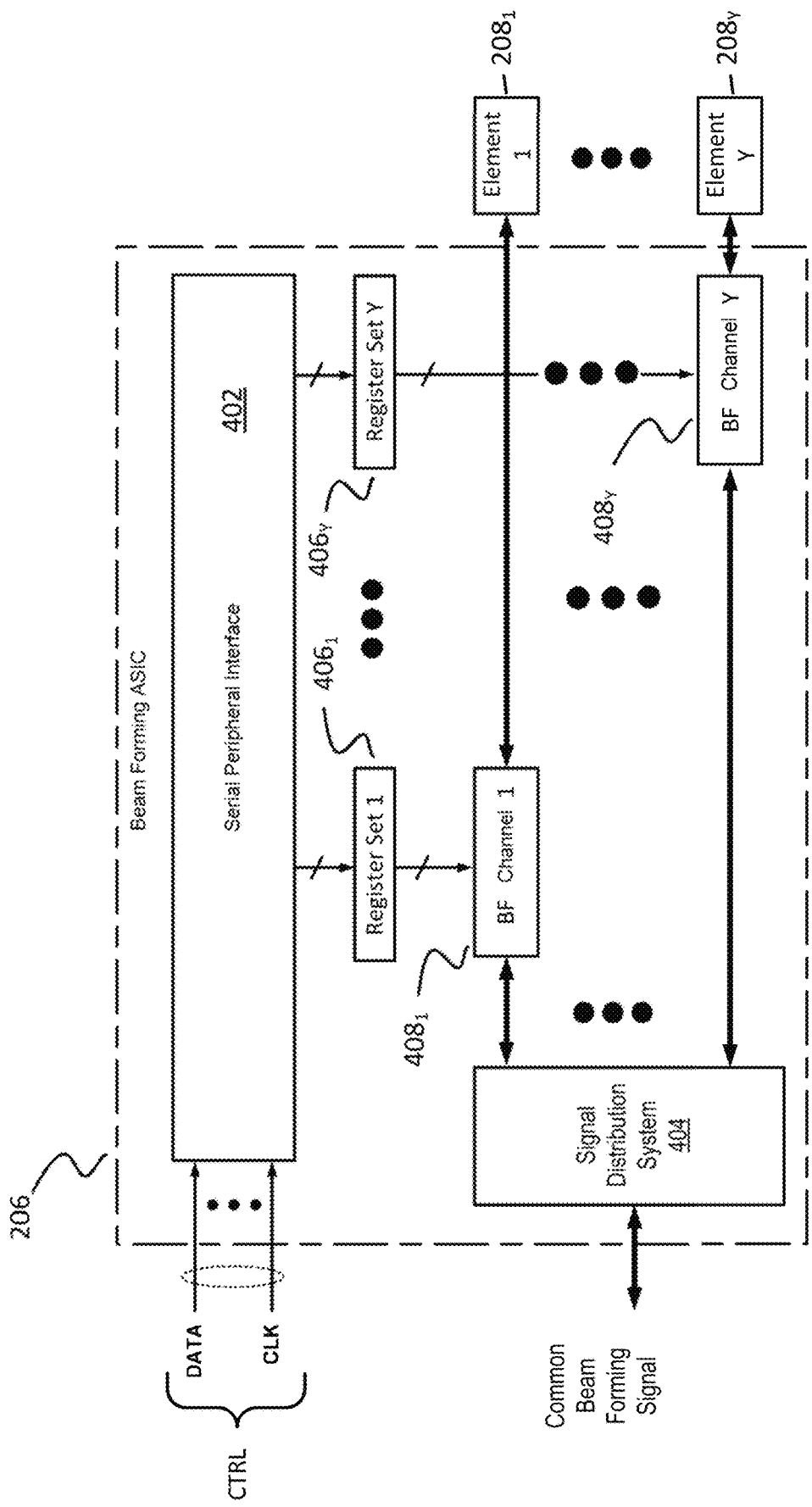
FIG. 4 is a block diagram schematically showing components of a beam forming ASIC, in accordance with certain exemplary embodiments known in the art.

FIG. 4 is a block diagram schematically showing components of a beam forming ASIC 206, in accordance with certain exemplary embodiments known in the art. Among other things, the beam forming ASIC 206 includes a Serial Peripheral Interface (SPI) controller 402 or other appropriate controller for interfacing with the beam forming controller 202 via the control (CTRL) signals, a signal distribution system 404 for distributing the common beam forming signal to and/or from each of Y beam forming channels 408$_1$-408$_Y$, and a register set 406$_1$-406$_Y$ for configuring each of the Y beam forming channels 408$_1$-408$_Y$, respectively. Each register set 406 may include one or more registers for programming the complex beam weight of corresponding beam forming channel 408. For example, each register set 406 may include a single register that is used to store a codeword including both gain/amplitude and phase parameters for the corresponding beam forming channel 408, or each register set 406 may include separate registers that are used to store separate gain/amplitude and phase parameters for the corresponding beam forming channel 408.

Figure 5:
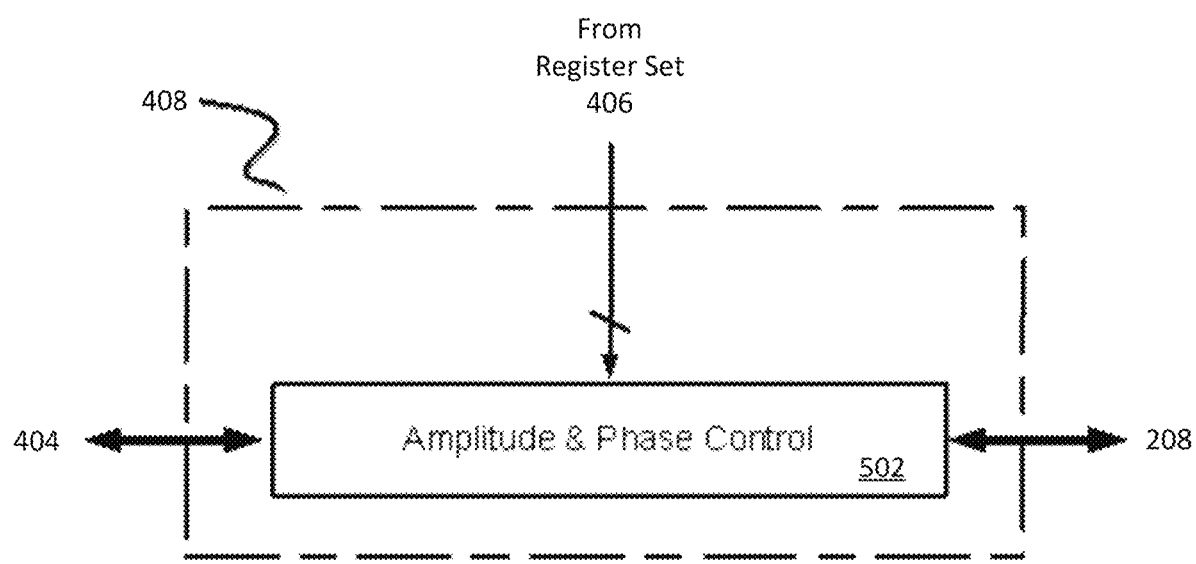
FIG. 5 is a block diagram schematically showing components of a beam forming channel at a high level, in accordance with certain exemplary embodiments.

FIG. 5 is a block diagram schematically showing components of a beam forming channel 408 at a high level, in accordance with certain exemplary embodiments. Among other things, the beam forming channel 408 includes amplitude and phase control circuitry 502 that adjusts the gain/amplitude and phase of the signal to or from the beam forming element 208 based on gain/amplitude and phase parameters from the corresponding register set 406. As discussed above, a beam forming channel 408 may be configured as transmit-only, receive-only, or dual-mode, and phased array systems may be configured with all transmit-only channels, all receive-only channels, all dual-mode channels, or a mix of different types of channels. A transmit-only or dual-mode beam forming channel typically includes transmit path circuitry including a power amplifier, while a receive-only or dual-mode beam forming channel typically includes receive path circuitry including a low noise amplifier. The beam forming channel also may include additional amplifiers and/or buffers (e.g., for adding delay to a signal for phase shifting).

Figure 6:
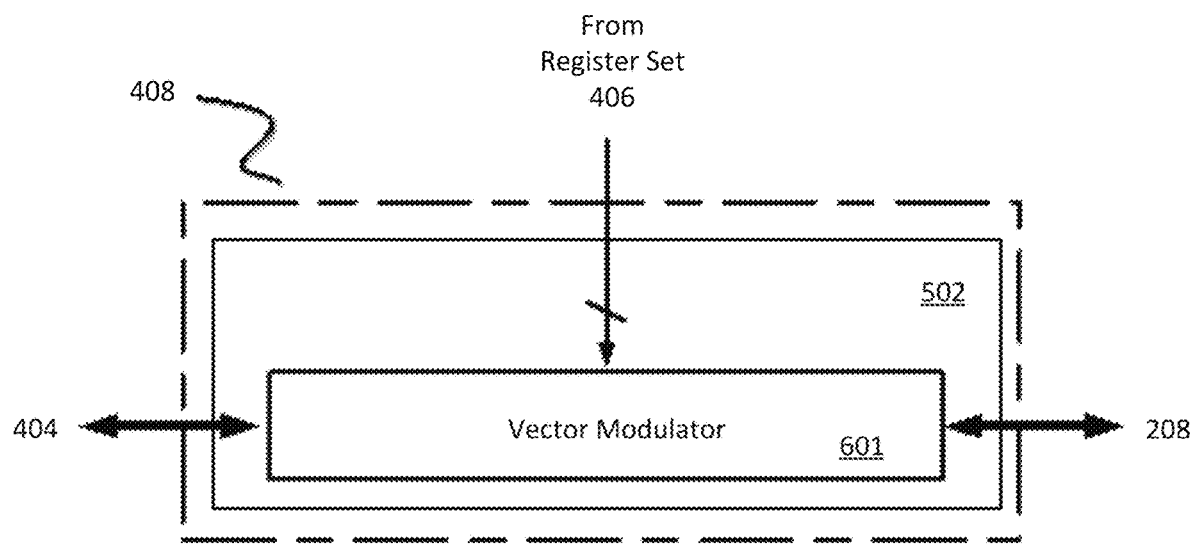
FIG. 6 schematically shows an exemplary architecture of the amplitude and phase control circuitry of a beam forming channel including a single vector modulation circuit, in accordance with certain exemplary embodiments.
Figure 7:
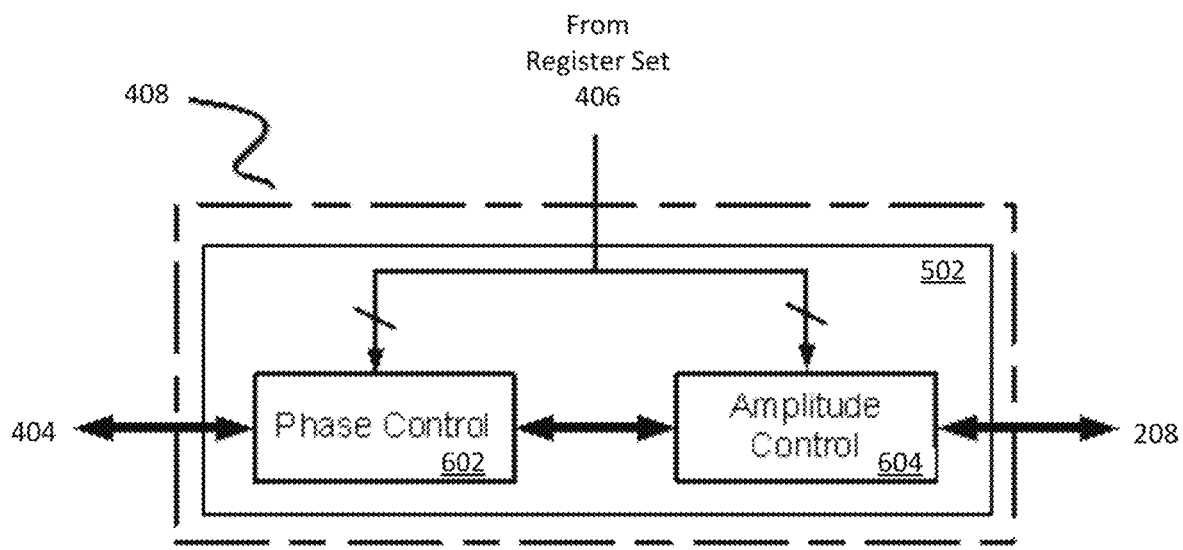
FIG. 7 schematically shows an exemplary architecture of the amplitude and phase control circuitry of a beam forming channel including separate gain/amplitude and phase control circuits, in accordance with certain exemplary embodiments.

FIGS. 6 and 7 schematically show two exemplary architectures of the amplitude and phase control circuitry 502, in accordance with certain exemplary embodiments. In FIG. 6, the amplitude and phase control circuitry 502 includes a vector modulator circuit 601 that adjusts both the amplitude and phase of the signal to or from the beam forming channel 408 based on the gain/amplitude and phase parameters from the corresponding register set 406. In FIG. 7, the amplitude and phase control circuitry 502 includes separate phase control circuitry 602 and amplitude control circuitry 604, where the phase control circuitry 602 adjusts the phase of the signal to or from the beam forming channel 408 based on phase parameters from the corresponding register set 406, and the amplitude control circuitry 604 adjusts the gain/amplitude of the signal to or from the beam forming channel 408 based on gain/amplitude parameters from the corresponding register set 406. As mentioned above, the register set 406 may include a single register that is used to store a codeword including both gain/amplitude and phase parameters for the corresponding beam forming channel 408, in which case the codeword may be decoded to provide phase parameters to the phase control circuitry 602 and gain/amplitude parameters to the amplitude control circuitry 604, or the register set 406 may include separate registers that are used to store separate gain/amplitude and phase parameters for the corresponding beam forming channel 408, in which case the phase parameters from the phase register may be provided to the phase control circuitry 602 and the gain/amplitude parameters from the gain/amplitude register may be provided to the amplitude control circuitry 604.

Figure 8:
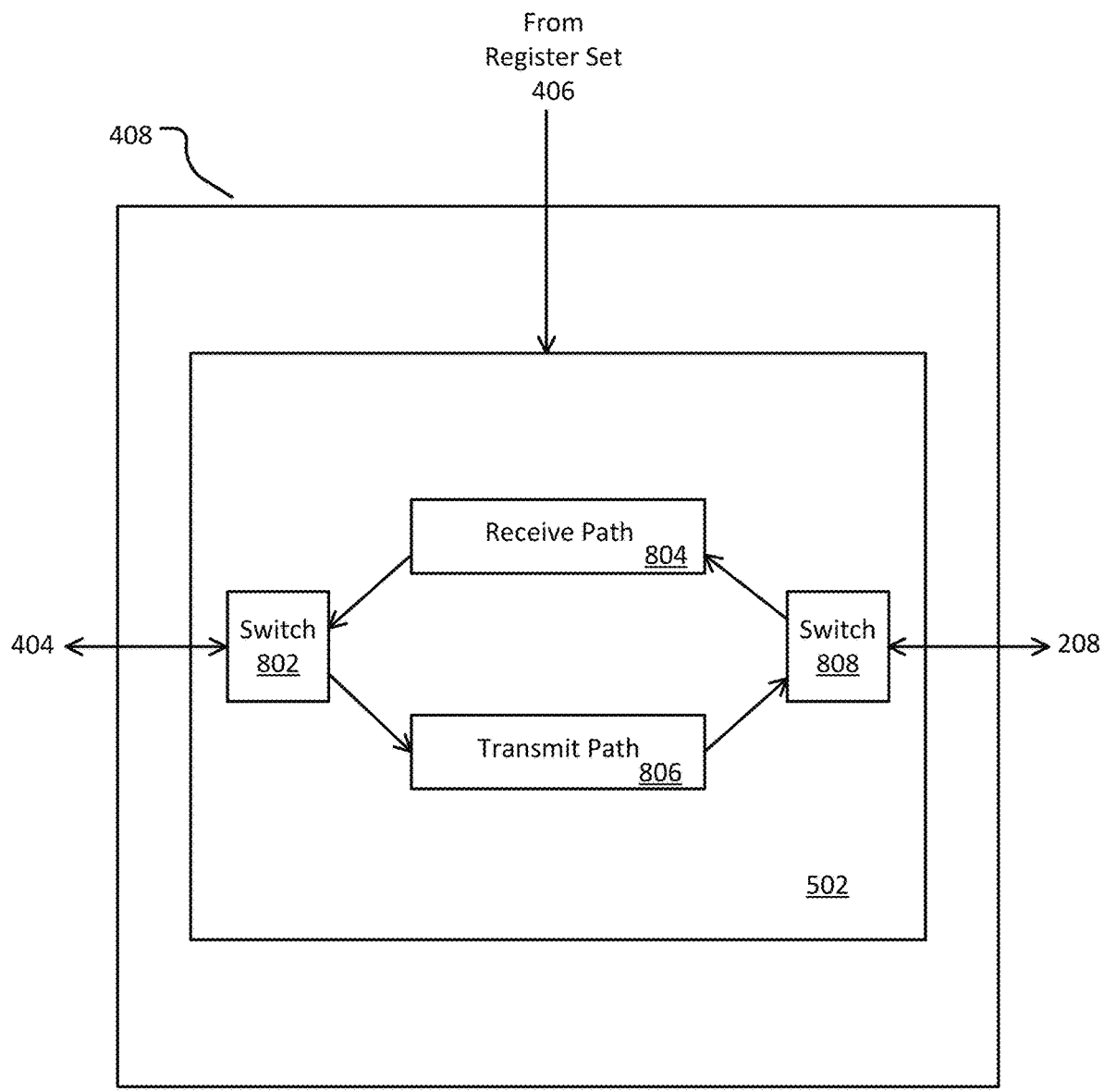
FIG. 8 is a block diagram schematically showing components of the amplitude and phase control circuitry for use with dual-mode elements, in accordance with certain exemplary embodiments.

FIG. 8 is a block diagram schematically showing components of the amplitude and phase control circuitry 502 for use with dual-mode elements, in accordance with certain exemplary embodiments. Among other things, the amplitude and phase control circuitry 502 includes transmit path circuitry 806, receive path circuitry 804, and switches 802 and 808. The transmit path circuitry 806 may be configured substantially as discussed above with reference to FIGS. 6 and 7 for adjusting gain/amplitude and phase of signals being sent to the beam forming element 208 from the signal distribution system 404, while the receive path circuitry 804 may be configured substantially in the reverse of the transmit path circuitry 806 for adjusting gain/amplitude and phase of signals received from the beam forming element 208 and provided to the signal distribution system 404. The transmit path 806 and the receive path 804 may be separate circuits, or, in some embodiments, may include some common circuitry (e.g., the amplitude control circuitry and/or the phase control circuitry may be shared by the two signal paths). In this example, the register set 406 includes, in addition to gain/amplitude parameters and phase parameters, a mode selection parameter to select the mode for the beam forming channel (e.g., transmit mode vs. receive mode). This mode selection parameter is used to control the switches 802 and 808 to select the appropriate signal path, i.e., the transmit path 806 for transmit mode and the receive path 804 for receive mode. The gain/amplitude and phase parameters from the register set 406 are provided to the appropriate signal path. The register set 406 may include a single register that is used to store a codeword including gain/amplitude parameters and phase parameters as well as the mode selection parameter for the corresponding beam forming channel 408, in which case the codeword may be decoded to provide the mode selection parameter to the switches 802 and 808 and to provide phase parameters to phase control circuitry and gain/amplitude parameters to amplitude control circuitry, or the register set 406 may include a separate mode selection register for the mode selection parameter, in which case the mode selection parameter from the mode selection register may be provided to the switches 802 and 808. It should be noted that, in certain alternative embodiments, the switches 802 and 808 may be omitted and instead the mode selection parameter used to enable the appropriate signal path (e.g., power on the selected signal path circuitry and power off the other signal path circuitry).

In any case, transmit path circuitry in a transmit-only or dual-mode beam forming channel 408 typically includes a power amplifier, while receive path circuitry in a receive-only or dual-mode beam forming channel 408 typically includes a low noise amplifier. The beam forming channel 408 also may include additional amplifiers and/or buffers (e.g., for adding delay to a signal for phase shifting).

In operation, the beam forming controller 202 configures each register set 406 with beam forming parameters for the corresponding beam forming channel 408, such as, for example, phase and gain parameters for the beam forming channel, and, when the beam forming elements 208 are dual-mode elements, optionally also the mode for the beam forming channel (e.g., transmit mode vs. receive mode).

From time to time, the beam forming controller 202 may need to reconfigure the operation of the phased array system 100, e.g., by switching between transmit mode and receive mode and/or reconfiguring the phase and gain parameters for each of the beam forming elements 208 such as to change the effective shape, directivity, direction, or power of a beam-formed signal. Effectively, the rate of such reconfiguration of the phased array system 100 is limited by the rate at which the beam forming controller 202 can write new parameters to Y registers in the X beam forming ASICs 206. In certain implementations, such reconfiguration may involve at least (X*Y) write operations (e.g., one write operation per beam forming channel).

In the exemplary embodiment described above with reference to FIG. 4, each beam forming ASIC 206 includes an SPI controller 402 for interfacing with the beam forming controller 202 (which also includes an SPI controller) over an SPI bus. Generally speaking, the beam forming controller 202 operates as the SPI bus master device and the beam forming ASICs 206 operate as SPI bus slave devices.

Figure 9:
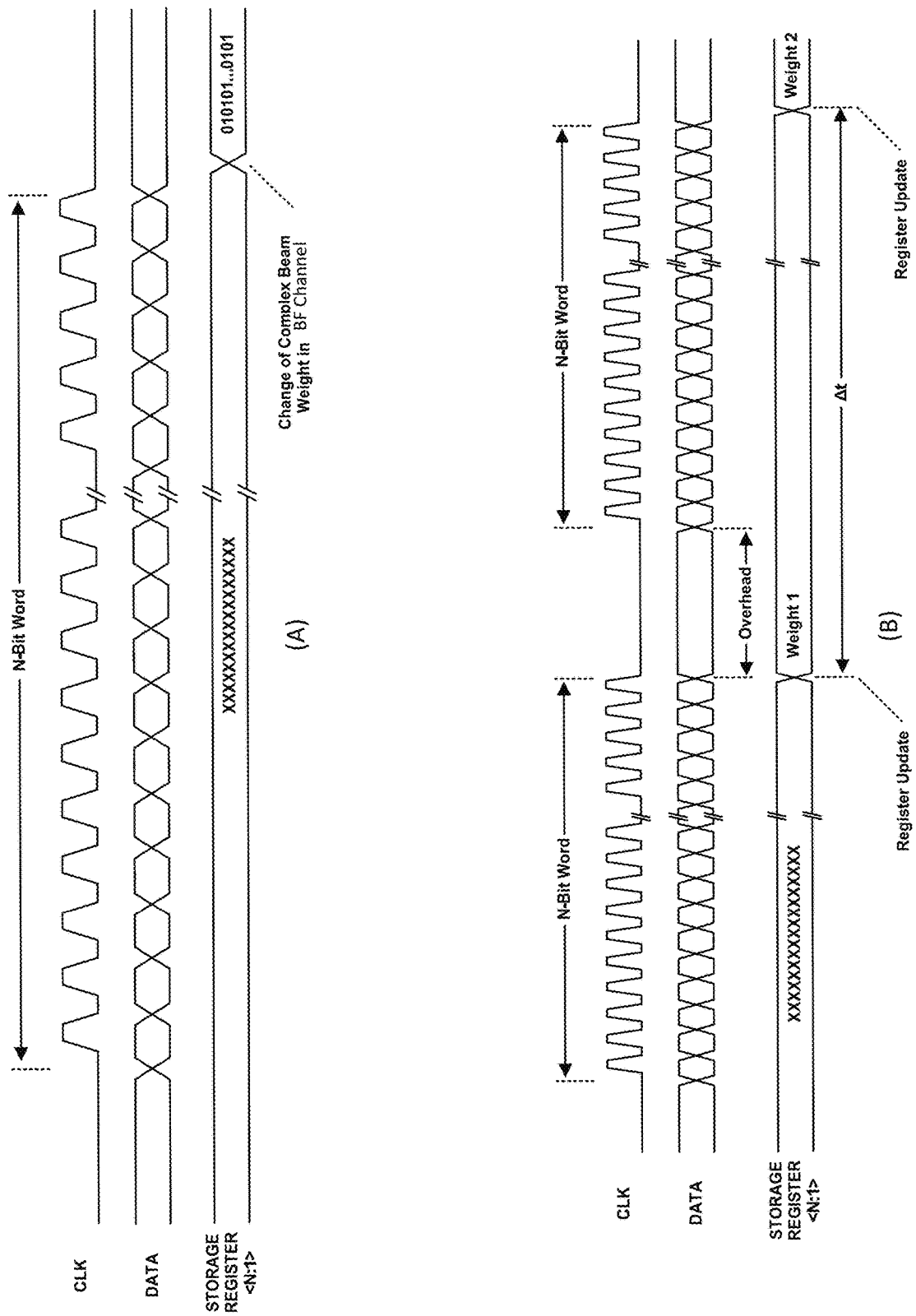
FIG. 9 shows an exemplary write sequence and write sequence timing requirements, in accordance with certain exemplary embodiments.

FIG. 9(A) shows an example of this write sequence, where an N-Bit word is supplied by the beam forming controller 202 via the SPI Bus. The N-bit word may include address information (e.g., to select the register set that is being written) as well as the gain/amplitude and phase parameters (e.g., in the form of a codeword) and possibly additional information (e.g., a mode selection parameter for switching dual-mode elements between transmit mode and receive mode). At the end of the N-Bit sequence, the contents of the register set are overwritten and the complex beam weight of the beam forming channel is changed based on the contents of the register set.

FIG. 9(B) shows typical timing requirements for writing multiple N-Bit words by the beam forming controller 202 via the SPI Bus. As this figure shows, the time required to change the complex beam weight of a beam forming channel from Weight1 to Weight2 is $\Delta t$, where $\Delta t$ is the sum of the timing overhead (required between writes) and the time required to write the N-bit codeword. Thus, $\Delta t$ is essentially a lower bound on the time to reconfigure the entire array (e.g., if all register sets can be written concurrently across all beam forming ASICs), although the entire write sequence could take on the order of $(X*Y*\Delta t)$ if each register set needs to be written independently/sequentially or on the order of $(X*Y*\Delta t)/P$ if P beam forming ASICs can be written in parallel, which is a bottleneck for the update time of the system.

Furthermore, if each beam forming channel 408 is reprogrammed upon completion of the write to the corresponding register set 406, then the beam forming channels 408 (or various subsets of the beam forming channels 408) could switch to the new configuration at slightly different times, which could degrade the quality of beam forming operations. This can be remedied, for example, by latching the current codewords being used by the beam forming channels while new codewords are written and then activating all of the new codewords at the same time using a common signal from the beam forming controller 202, although such a mechanism would not change the update time of the system, which still involves writing (X*Y) register sets.

Therefore, in certain embodiments, rather than each beam forming ASIC 206 including a single register set for each beam forming channel, each beam forming ASIC includes a register bank for each beam forming channel, where the register bank includes a plurality of register sets. The register banks can be preprogrammed with beam forming parameters for multiple potential beam forming operations and then, using switching logic, individual register sets can be sent (via instructions from the beam forming controller 202) simultaneously to their corresponding beam forming channels to effectuate particular beam forming operations. The switching logic can be configured for random access to the register sets of the register banks or for sequential or round-robin access to the register sets of the register banks, typically asynchronously with respect to the SPI interface 402. The complex beam weight of a given beam forming channel is determined by the parameters presented to the beam forming channel from such switching.

Figure 10:
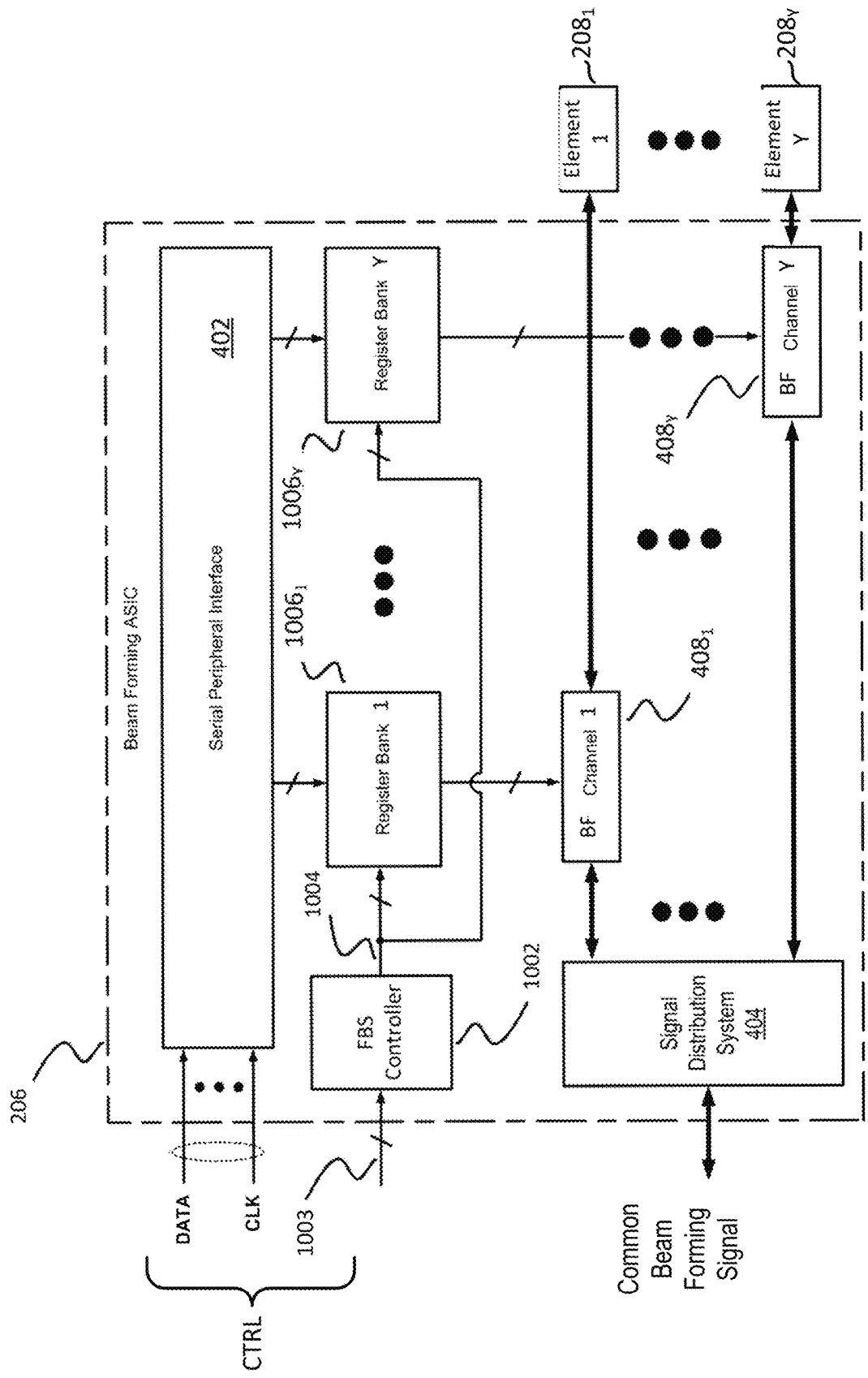
FIG. 10 is a block diagram schematically showing components of a beam forming ASIC having register banks, in accordance with certain exemplary embodiments.

FIG. 10 is a block diagram schematically showing components of a beam forming ASIC 206, in accordance with certain exemplary embodiments. Among other things, the beam forming ASIC 206 includes the Serial Peripheral Interface (SPI) controller 402 or other appropriate controller for interfacing with the beam forming controller 202 via the control (CTRL) signals, the signal distribution system 404 for distributing the common beam forming signal to and/or from each of the Y beam forming channels $408_1$-$408_Y$, and a register bank $1006_1$-$1006_Y$ for configuring the Y beam forming channels $408_1$-$408_Y$, respectively. Each register bank includes M register sets 406 (for convenience, referred to herein as register set 1 through register set M), where each register set 406 may include one or more registers for programming the complex beam weight (and optionally other parameters, e.g., the operating mode) of corresponding beam forming channel 408. For example, each register set 406 may include a single register that is used to store a codeword including both gain/amplitude and phase parameters for the corresponding beam forming channel 408, or each register set 406 may include separate registers that are used to store separate gain/amplitude and phase parameters for the corresponding beam forming channel 408. A Fast Beam Switching (FBS) Controller 1002 outputs register selection signals 1004 based on FBS signals 1003 received from the beam forming controller 202. For random access to the register sets in the register banks, the FBS signals 1003 may include addresses conveyed via a serial bus or a parallel bus (e.g., a four-bit parallel bus could be used to address 16 register sets) and the FBS Controller 1002 may include an address decoder. For sequential or round-robin access to the register sets in the register bank, the FBS signals 1003 may involve simple clock-like pulses and the FBS Controller 1002 may include an address generator to step through the register sets at each clock pulse. Other types of register selection configurations may be used in various alternative embodiments, and in some embodiments, the FBS Controller 1002 may be omitted, with FBS signals 1003 provided directly to and processed by the register banks 1006.

The FBS Controller 1002 and/or the corresponding FBS signals 1002 can be implemented in any of a variety of ways, and the present invention is not limited to any particular register selection technique. Without limitation, the following are some exemplary register selection techniques:

1) Addressing Through M Discrete Control Lines

In this implementation, the FBS signals 1003 are P discrete lines provided to the beam forming ASICs 206. These P discrete lines could be processed by the FBS Controller 1002 to generate register selection signals 1004 or could be fed directly to the register banks 1006 (circumventing the need for a separate FBS Controller 1002) in which case the FBS signals 1003 could serve as the register selection signals 1004. These P discrete lines can generate $2^P$ discrete addresses, thereby allowing the system to address up to $2^P$ register sets (e.g., the number of register sets per register bank referred to as "M" in FIG. 11 could equal $2^P$).

Figure 16:
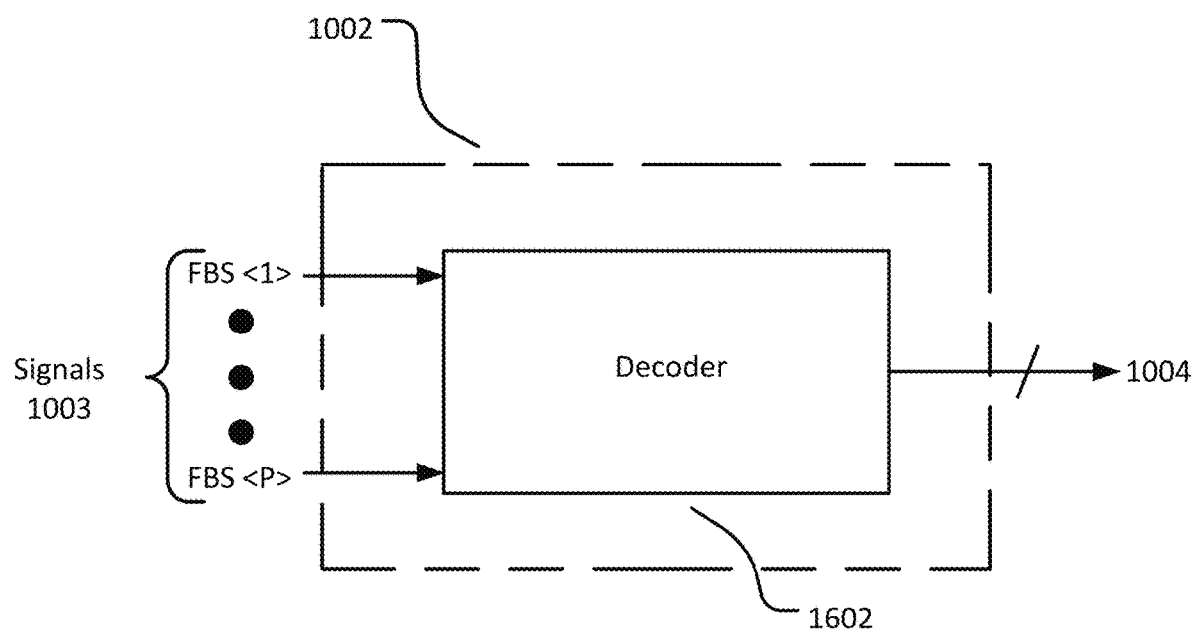
FIG. 16 schematically shows a fast beam switching controller for addressing through M discrete control lines, in accordance with certain exemplary embodiments.

FIG. 16 schematically shows an FBS Controller 1002 for addressing through M discrete control lines, in accordance with certain exemplary embodiments. In this example, the FBS Controller 1002 includes a decoder 1602 that is configured to decode the M discrete control lines of the FBS interface 1003 to produce the register selection signals 1004 (e.g., decoded addresses). Alternatively, if no decoding is needed, block 1602 may consist of a set of buffers/line drivers.

2) Addressing Through a Counter

In this implementation, the FBS signals 1003 can be as few as one line. This line can be toggled up and down by the host system, to update the address. The FBS Controller 1002 could count the number of times the line was toggled and from that count determine the selected register set and output the appropriate register selection signals 1004. The depth of the counter would determine the number of unique addresses that could be generated and thus the number of register sets that could be supported in the register banks. Additional control lines could be included in this implementation to improve robustness. One example would be an "enable" line that gates the clock and resets the counter between address updates. Among other things, this could improve noise immunity and ensure that the state of each counter is consistent across multiple beam forming ASICs 206 on the phased array system 100.

Figure 17:
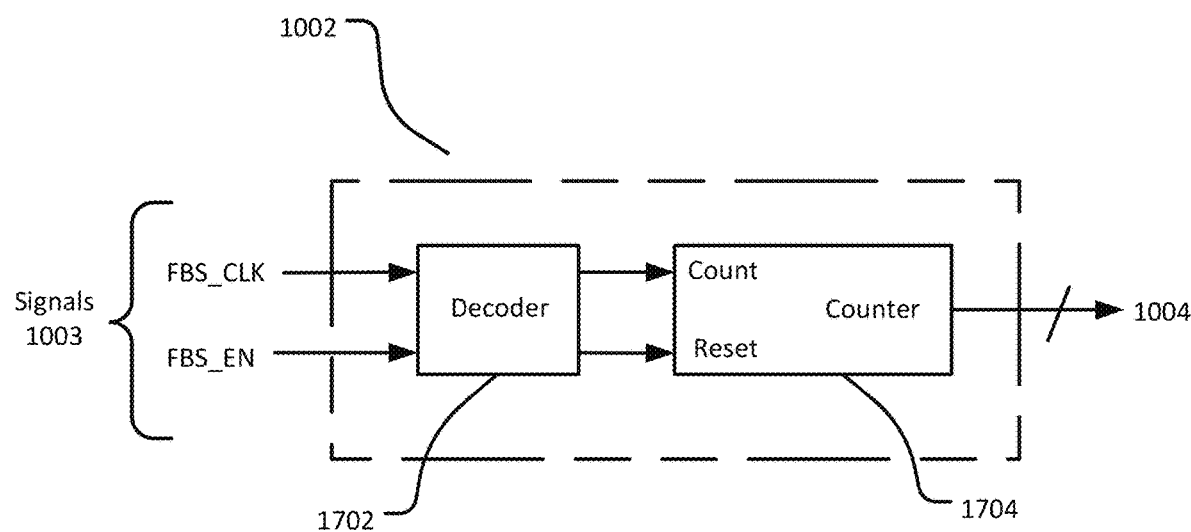
FIG. 17 schematically shows a fast beam switching controller for addressing through a counter, in accordance with certain exemplary embodiments.

FIG. 17 schematically shows an FBS Controller 1002 for addressing through a counter, in accordance with certain exemplary embodiments. In this example, the FBS Controller 1002 includes a decoder 1702 and a counter 1704, and the FBS signals 1003 include two lines, namely a clock line (FBS_CLK) and an enable line (FBS_EN). The FBS_EN line "gates" the FBS_CLK signal so that only when the enable signal is active will the counter start to accumulate, e.g., when the enable line is active, the decoder 1702 passes the clock signal through to the counter 1704, and when the enable line is inactive, the value of the counter 1704 can be passed as register selection signals 1004 to select the appropriate register set. The enable signal can also be used to generate a reset pulse to reset the counter, e.g., the decoder 1702 monitors the enable line to detect a reset signal and generates a corresponding reset signal to the counter 1704 upon detecting the reset signal from the enable line. Among other things, gating the clock signal helps to provide noise immunity, and resetting the counter helps to guarantee that all of the FBS controllers are generating the same address.

3) Addressing Through a Separate Fast Beam Switching Clock/Data Line

In this implementation, the FBS signals 1003 may consist of a clock/data line that works independently of the SPI Bus. In this approach, data is clocked in to the FBS Controller 1002 and stored to produce an address for selecting the register set.

Figure 18:
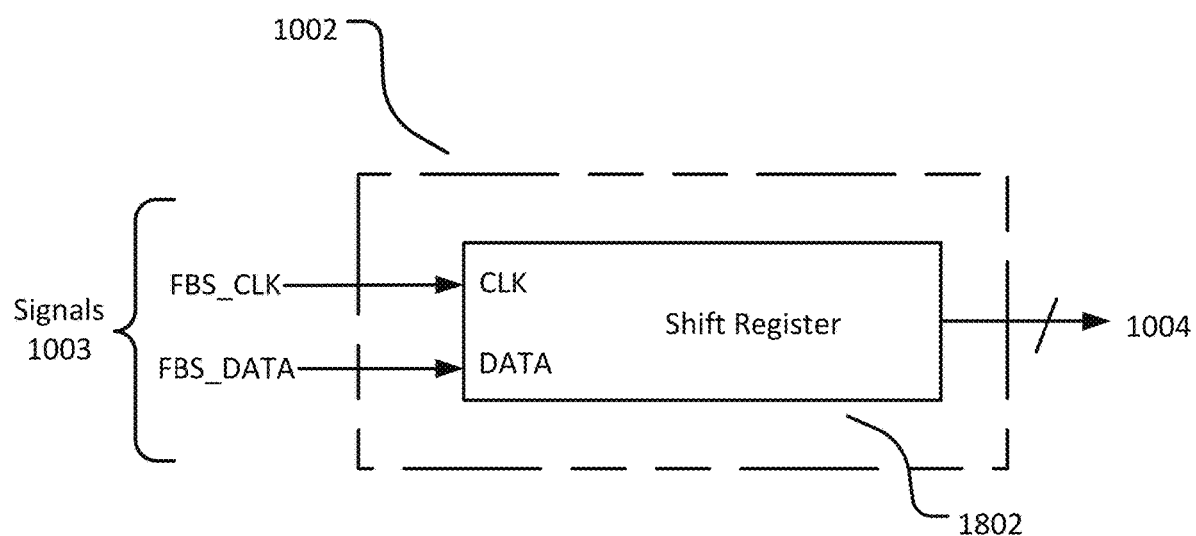
FIG. 18 schematically shows a fast beam switching controller for addressing through a separate fast beam switching clock/data line, in accordance with certain exemplary embodiments.

FIG. 18 schematically shows an FBS Controller 1002 for addressing through a separate fast beam switching clock/data line, in accordance with certain exemplary embodiments. In this example, the FBS Controller 1002 includes a shift register 1802, and the FBS signals 1003 include two lines, namely a clock line (FBS_CLK) and a data line (FBS_DATA). The FBS_DATA line carries the address data to be decoded and sent to the register bank switches via register selection signals 1004. Data bits are clocked in using the FBS_CLK line. The depth of the shift register dictates the length of the address. One advantage to this approach is that, for example, 32 (2^6) states requires only 6 clock cycles to update the address, whereas the counter of FIG. 17 may require up to 31 clock pulses to update a state (e.g., if FBS address 31 is desired).

4) Addressing Through a Separate SPI-Based Interface

In this implementation, the FBS signals 1003 could include a set of lines selected from the SPI Bus and/or a set of lines specifically for FBS control. The FBS Controller 1002 would operate as a secondary FBS Serial Peripheral Interface (FBS SPI) that deciphers clock/data signals to generate an address for selecting the register set. FBS SPI write times would be much shorter than writing to the standard SPI, which would increase the beam switching rate.

Figure 19:
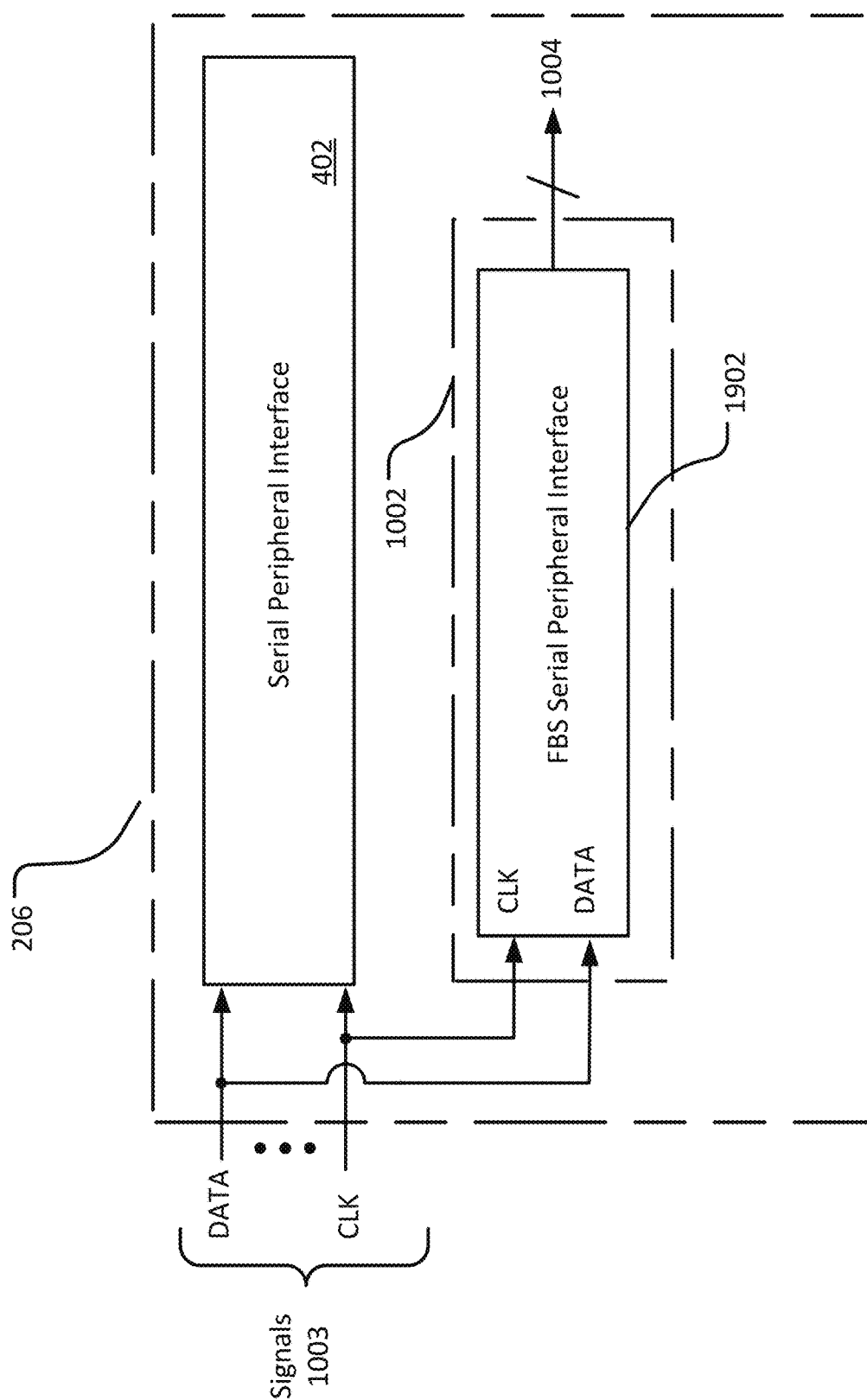
FIG. 19 schematically shows a fast beam switching controller for addressing through a separate SPI-based interface, in accordance with certain exemplary embodiments.

FIG. 19 schematically shows an FBS Controller 1002 for addressing through a separate SPI-based interface, in accordance with certain exemplary embodiments. In this example, the FBS Controller 1002 includes a FBS Serial Peripheral Interface 1902 that shares data and clock lines with the standard Serial Peripheral Interface 402. Here, the Standard SPI 402 generally would be designed to ignore communications that are intended for the FBS SPI 1902, while the FBS SPI 1902 generally would be designed to ignore communications that are intended for the standard SPI 402. This can be accomplished, for example, through addressing, encoding, time-division multiplexing, frequency-division multiplexing, or other mechanism. As mentioned above, the FBS signals 1003 could include a set of lines specifically for FBS control. For example, an additional FBS enable line may be used to enable or disable the FBS SPI 1902. This would allow for time division multiplexing between the standard SPI 402 and the FBS SPI 1902.

5) Addressing Through a Clock Signal

In this implementation, the FBS signals 1003 could be a single line, where the beam forming controller 202 generates a clock pulse each time it wants to move to the next successive register set in the register bank. Based on such a clock signal, the FBS Controller 1002 could generate the appropriate address selection signals 1004, or in some embodiments the FBS Controller 1002 could be omitted and instead the clock signal could be applied directly to the register bank where circuitry outputs the next successive register set at each clock pulse. This type of register selection mechanism could be used to provide sequential access to the register sets (e.g., stepping from register set 1 to register set M) or to provide round-robin access to the register sets (e.g., stepping from register set 1 to register set M and recycling to register set 1). A "synchronization" signal could be sent by the beam forming controller 202 from time to time in order to reset or otherwise synchronize all of the beam forming ASICs 206 (e.g., reset to the first register set).

Figure 20:
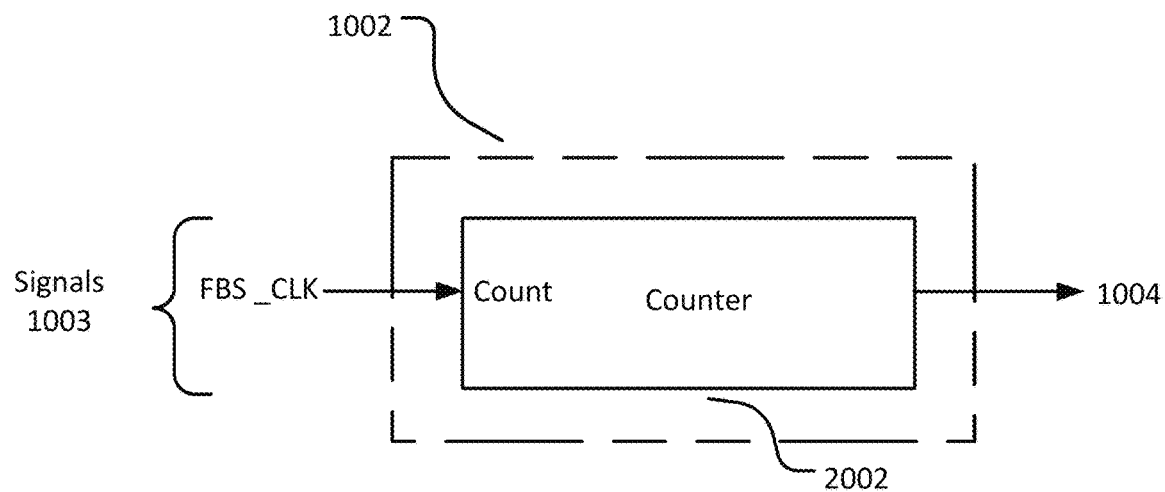
FIG. 20 schematically shows a fast beam switching controller for addressing through a clock signal, in accordance with certain exemplary embodiments.

FIG. 20 schematically shows an FBS Controller 1002 for addressing through a clock signal, in accordance with certain exemplary embodiments. In this example, the FBS Controller 1002 includes a counter 2002 that is incremented on each cycle of a clock signal (FBS_CLK), e.g., on the rising or falling edge, to produce register selection signals 1004 that step through the register sets and optionally recycle back to the first register set for round-robin addressing. A reset mechanism similar to that shown in FIG. 17 can be included to reset the counter.

Figure 21:
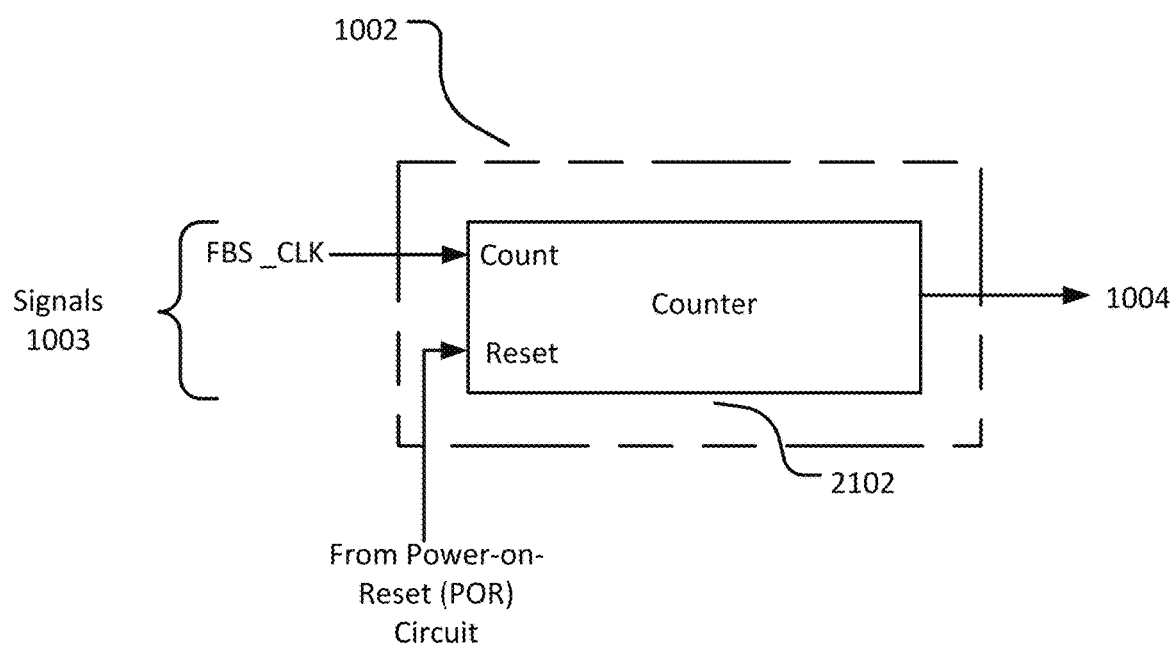
FIG. 21 schematically shows an alternate fast beam switching controller for addressing through a clock signal, in accordance with certain exemplary embodiments.

FIG. 21 schematically shows an alternate FBS Controller 1002 for addressing through a clock signal, in accordance with certain exemplary embodiments. In this example, the FBS Controller 1002 includes a counter 2102 that operates substantially as the counter 2002, but further includes a reset signal coming from a power-on-reset circuit and/or from the SPI. This resets the counter when the chip is powered on or arbitrarily when the controller 202 sends a reset signal through the SPI. This mechanism can be used to ensure that all chips in the array begin with the same FBS address (e.g. 1) at start up, and can be reset to the same value (e.g. 1) in the event that certain ASICs may have lost count over time.

However the FBS interface is implemented, the phased array system 100 and the beam forming ASICs 206 typically would be implemented such that all beam forming ASICs 206 in the phased array system 100 share the same FBS control lines/signals 1003 and therefore select the same register set in the register banks across all beam forming ASICs at substantially the same time (e.g., by decoding the same address or by incrementing through the register sets of the register banks in lock-step with one another). Thus, for example, for a given register selection address, the corresponding register sets across the phased array system 100 can be populated with data that points a beam in a particular direction, and, furthermore, the register sets corresponding to different register selection addresses can be configured to point the beam in a different direction (and, in certain exemplary embodiments as discussed below, also to change the number of active beam forming channels and/or adjust the DC power in one or more beam forming channels), thus changing such things as the effective aperture, G/T, EIRP, directivity, or DC power consumption of the phased array system 100. Given that the register selection address can be updated quickly through the FBS control lines/signals 1003, the beam forming operation of the phased array system 100 can be changed rapidly without having to program each beam forming channel 408 across all beam forming ASICs 206, thus allowing for rapid changes in effective aperture, G/T, EIRP, directivity, or DC power consumption of the array.

Figure 11:
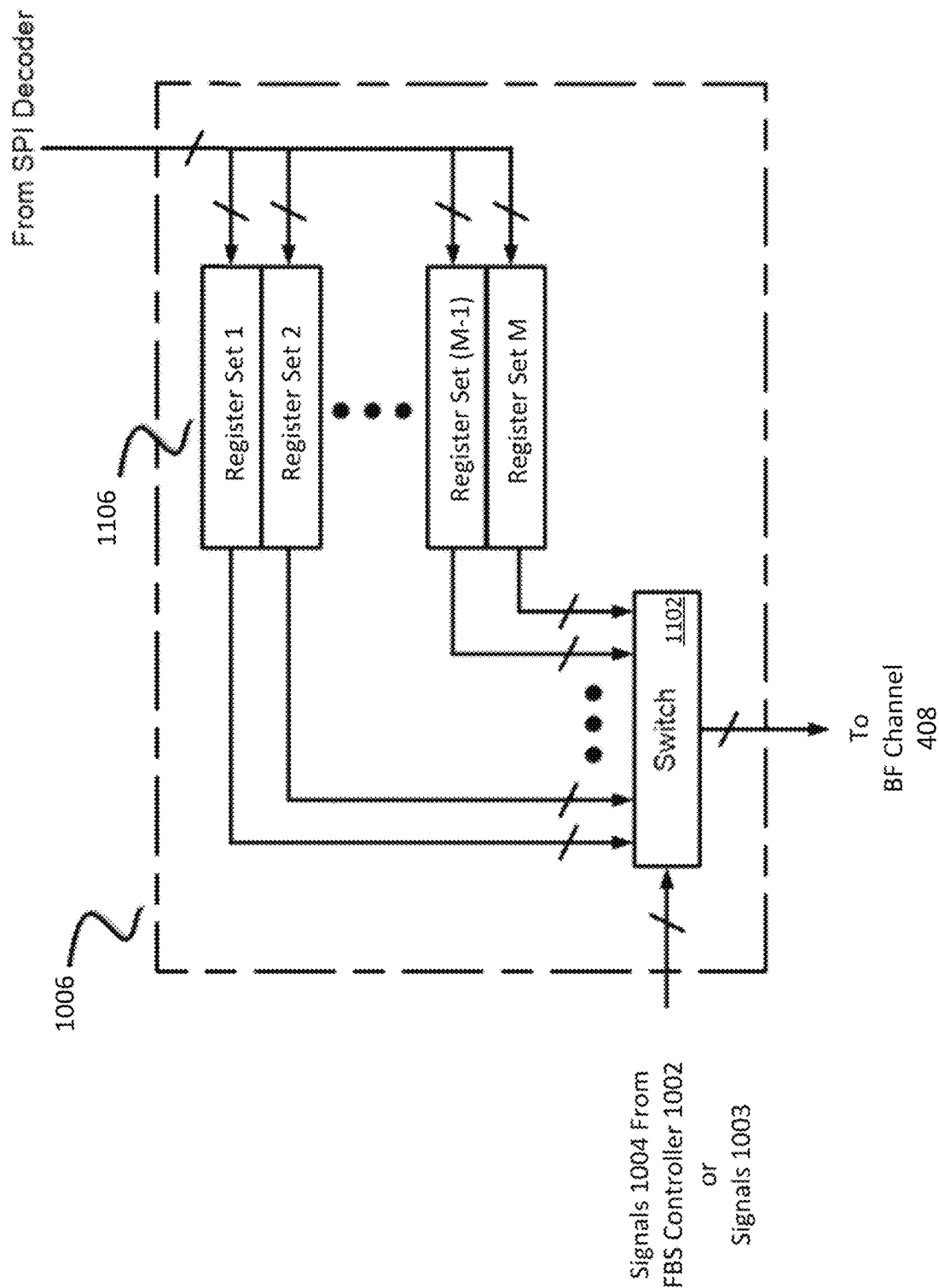
FIG. 11 is a block diagram schematically showing components of a register bank, in accordance with certain exemplary embodiments.

FIG. 11 is a block diagram schematically showing components of a register bank 1006, in accordance with certain exemplary embodiments. Among other things, the register bank 1006 includes M register sets 1106 and a switch 1102 that passes a selected one of the register sets 1106 to the beam forming channel 408, based on a register selection signal from the FBS controller 1002. In certain embodiments, the register sets may be accessed randomly (e.g., the beam forming controller 202 can address each register set individually and switch between them in a non-sequential manner, such as, for example, switching from register set 1 to register set 5 to register set 3 and so on), while in other embodiments, the register sets may be accessed sequentially or in a round-robin fashion (e.g., the beam forming controller 202 may cause the switch 1102 to step through the register sets in order from 1 to M and optionally back to 1).

It should be noted that, typically, the register selection signals 1003 from the beam forming controller 202 are provided to all of the beam forming ASICs 206 such that all beam forming channels 408 across all beam forming ASICs 206 are switched to the addressed register set at substantially the same time, e.g., if the beam forming controller 202 addresses register set 5, then all beam forming channels 408 across all beam forming ASICs 206 are switched to the corresponding register set 5 through a single addressing operation by the beam forming controller 202.

A major advantage of such use of register banks over conventional technology is that the beam forming ASICs 206 (and hence the phased array system 100) can switch between register sets at a much higher rate than the beam forming controller 202 can re-program a full complement of register sets across all beam forming ASICs. Thus, switching between different beam forming operations (e.g., switching between a transmit mode and a receive mode, or making adjustments to a beam-formed signal, orientation of the beam, directivity, EIRP, G/T, or DC power) can be accomplished at a much higher rate than in conventional systems. Such fast beam switching is likely to become a critical element of many future phased array systems such as for use in 5G applications and can enable different beam forming on each timing frame of a waveform.

Exemplary embodiments may be particularly useful for preprogramming and fast beam switching for a portion of the far field scan volume of the phased array system, up to and including the entire far field scan volume of the phased array system.

Figure 22:
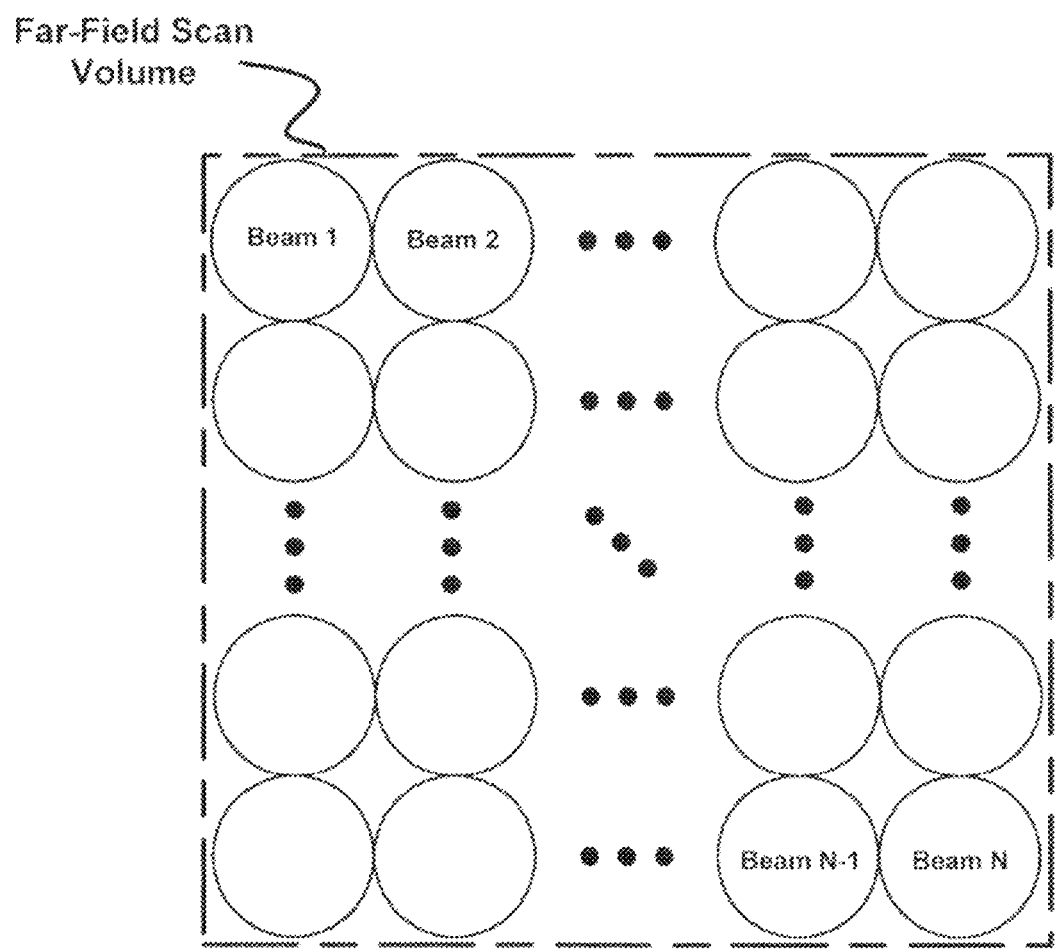
FIG. 22 schematically shows a scan volume filled by N beams, in accordance with certain exemplary embodiments.

FIG. 22 schematically shows a scan volume filled by N beams, in accordance with certain exemplary embodiments. If there are sufficient number of register banks/sets to preprogram all N of the beams (e.g., N register sets per register bank), then fast beam switching can be used to perform fast scans covering the entire far field scan volume using only the FBS control lines 1003, i.e., without having to reprogram any of the register sets. In this case, the beam forming controller 202 may preprogram all of the register sets in all of the register banks across all beam forming ASICs 206 with appropriate parameters for forming the N beams and then switch between register sets to selectively switch between beams. As discussed above, the beams may be accessed randomly (e.g., switching from beam 1 to beam N to beam 2, etc.) or may be accessed sequentially (e.g., switch from beam 1 to beam 2 to beam 3 and so on).

Another advantage of such use of register banks is that, in certain exemplary embodiments, the beam forming controller 202 can write new values to a group of "inactive" register sets while beam forming operations are being performed using a group of "active" register sets and in some embodiments even while the system is switching between register sets that are not currently being written. Among other things, such selective reprogramming can be used to dynamically "frame" a beam forming target even as the target moves.

Figure 23:
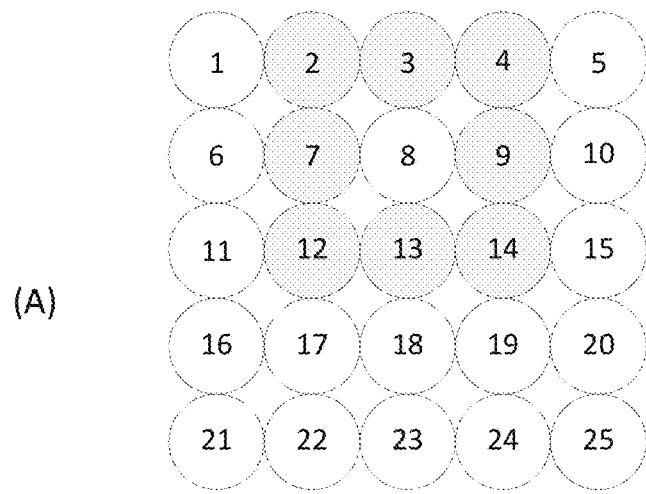
FIG. 23 schematically shows an example for selectively reprogramming register sets for dynamically framing a beam forming target, in accordance with certain exemplary embodiments.
Figure 23:
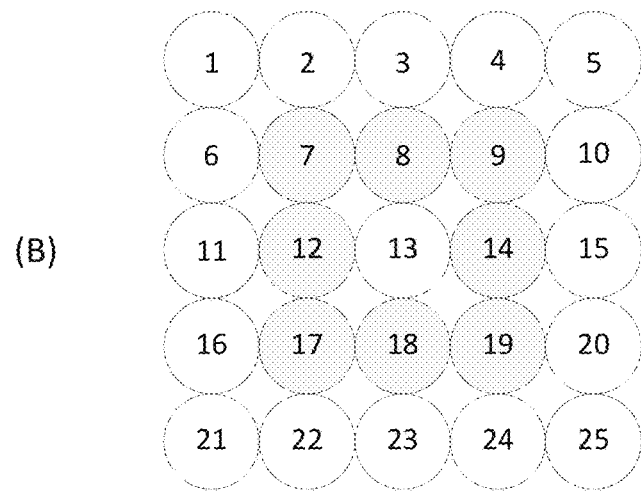
Figure 23:
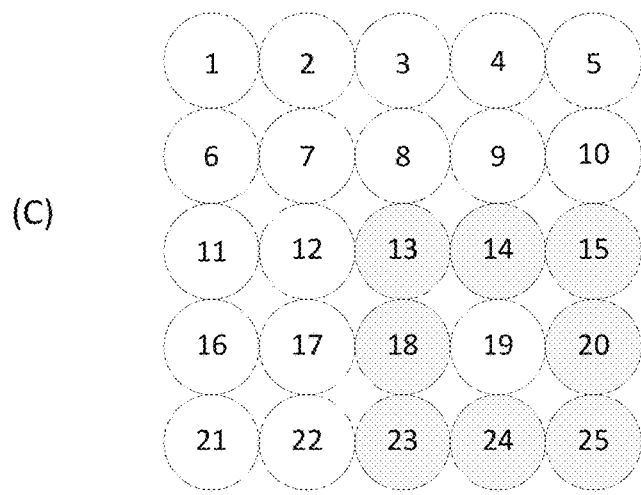

FIG. 23 schematically shows an example for selectively reprogramming register sets for dynamically framing a beam forming target, in accordance with certain exemplary embodiments. This example is presented using a portion of the far field scan volume of the phased array system covered by 25 beams numbered 1-25. In this example, it is assumed that there is not a sufficient number of register banks/sets to preprogram the entire far field scan volume. In FIG. 23(A), it is assumed that the target is within the area covered by beam 8, and therefore beam 8 would be configured using one of the register sets of the register banks, which would be the "active" register set. If the target moves out of the area covered by beam 8, then the target essentially must move into the area covered by beam 2, beam 3, beam 4, beam 7, beam 9, beam 12, beam 13, or beam 14 before moving into the area covered by other beams. With this knowledge, the beam forming controller 202 can preconfigure other register sets in the register banks with the parameters for beams 2, 3, 4, 7, 9, 12, 13 and 14. The beam forming controller 202 then can track movement/position of the target to detect the target leaving the area covered by beam 8 and entering the area covered by one of the other preprogrammed beams. The beam forming controller then can perform fast beam switching to switch the phased array system to the appropriate beam based on the new position of the target and can reprogram some of the register sets to "re-frame" the target based on the new beam.

For example, assume that the target moved from the area covered by beam 8 into the area covered by beam 13, as depicted in FIG. 23(B). The beam forming controller 202 could switch from beam 8 to beam 13 and then reconfigure the register sets that were formerly configured for beams 2-4 to include the parameters for beams 17-19, thereby "re-framing" the target about beam 13. In this case, the register sets configured with parameters for beams 7-9 and 12-14 may not need to be reconfigured because beams 7-9 and 12-14 are part of the new frame.

Now assume that the target moved from the area covered by beam 13 into the area covered by beam 19, as depicted in FIG. 23(C). The beam forming controller 202 could switch from beam 13 to beam 19 and then reconfigure the register sets that were formerly configured for beams 7, 8, 9, 12 and 17 to include the parameters for beams 15, 20, 23, 24 and 25, thereby "re-framing" the target about beam 19. In this case, the register sets configured with parameters for beams 13, 14, 18 and 19 may not need to be reconfigured because beams 13, 14, 18 and 19 are part of the new frame.

It should be noted that, in certain embodiments, the example of FIG. 23 could be implemented using nine register sets per register bank, given that parameters for nine beams are stored at any given time in this example. Thus, such framing can reduce the number of register sets per register bank needed for a particular implementation, which in some embodiments could allow more beam forming channels to be supported by each beam forming ASIC 206. FIG. 24 schematically shows exemplary register set configurations for the example of FIG. 23, in accordance with certain embodiments. Here, each register bank includes nine register sets labeled for convenience as Register Sets A through I.

For the framing scenario of FIG. 23(A), the beam forming controller 202 may configure the register sets in all register banks across all beam forming ASICs 206 as follows: Register Set A configured with parameters for beam 2; Register Set B configured with parameters for beam 3; Register Set C configured with parameters for beam 4; Register Set D configured with parameters for beam 7; Register Set E configured with parameters for beam 8; Register Set F configured with parameters for beam 9; Register Set G configured with parameters for beam 12; Register Set H configured with parameters for beam 13; and Register Set I configured with parameters for beam 14. In this example, the beam forming controller 202 would activate Register Set E (i.e., to operate beam 8) in all register banks across all beam forming ASICs 206.

For the re-framing scenario of FIG. 23(B), the beam forming controller 202 may reconfigure the register sets in all register banks across all beam forming ASICs 206 as follows: Register Set A reconfigured with parameters for beam 17; Register Set B reconfigured with parameters for beam 18; and Register Set C reconfigured with parameters for beam 19. Thus, only three register sets per register bank would need to be reconfigured in this example. In this example, the beam forming controller 202 would activate Register Set H (i.e., to operate beam 13) in all register banks across all beam forming ASICs 206.

For the re-framing scenario of FIG. 23(C), the beam forming controller 202 may reconfigure the register sets in all register banks across all beam forming ASICs 206 as follows: Register Set A reconfigured with parameters for beam 15; Register Set D reconfigured with parameters for beam 20; Register Set E reconfigured with parameters for beam 23; Register Set F reconfigured with parameters for beam 24; and Register Set G reconfigured with parameters for beam 25. Thus, only five register sets per register bank would need to be reconfigured in this example. In this example, the beam forming controller 202 would activate Register Set C (i.e., to operate beam 19) in all register banks across all beam forming ASICs 206.

Thus, the beam forming controller 202 may include circuitry configured to preconfigure register sets to frame a particular target based on the position of the target, track movement of the target to a new position, perform fast beam switching to select an appropriate beam configuration based on the new position, and reconfigure a subset of the register sets to re-frame the target based on the new position.

In addition to the use of register banks, or separate from the use of register banks, certain embodiments include additional logic allowing the beam forming controller 202 to selectively control DC power consumption of individual beam forming channels, e.g., for selectively powering on and off circuitry in the beam forming channels (e.g., which can be used to effectively shut off unneeded beam forming channels and hence to effectively control the number of "active" beam forming channels) and in some embodiments also for adaptively adjusting power to circuitry in the beam forming channels (e.g., which can be used to reduce power consumption by one or more active beam forming channels in appropriate situations). Conventionally, the circuitry in a beam forming channel is powered on and consumes electric power even if, say, the gain/amplitude for the beam forming channel is programmed to zero. Many applications, such as in 5G communication devices, are very sensitive to power consumption, so the ability to selectively control DC power to individual beam forming channels helps to reduce power consumption and therefore provides a major advantage over conventional technology. Such selective control of individual beam forming channels can be done through the register sets (e.g., deriving a power control parameter from the existing codeword information such as using the gain/amplitude parameter as an on/off or power level indicator, designating one or more previously unused codeword bits as an enable/disable control or power level control for the corresponding beam forming channel, or adding a new register to the register set to control the beam forming channel) or can be done outside of the register sets (e.g., using a separate register in the beam forming ASIC to selectively control each beam forming channel).

The ability to selectively turn on and off individual beam forming channels also allows the system to selectively change the effective directivity of the array. For example, for a far target, all beam forming channels might be turned on for maximum array directivity and range, whereas for a near target, outer beam forming channels might be turned off to reduce array directivity and reduce DC power since maximum array directivity and maximum range generally are not required.

Figure 12:
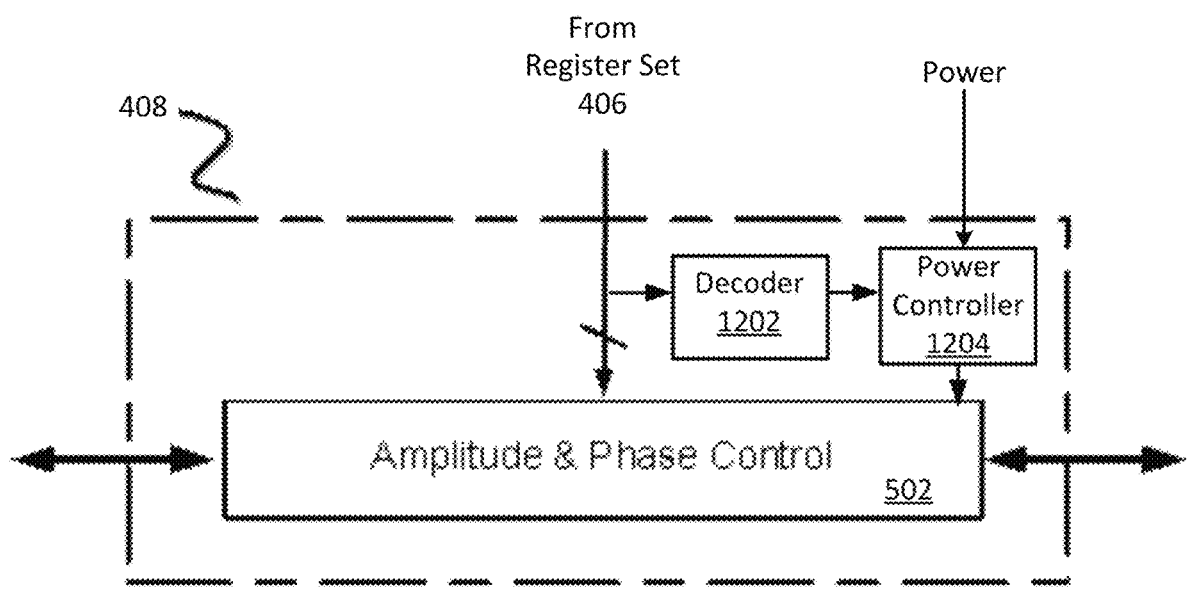
FIG. 12 is a block diagram schematically showing components of a beam forming channel including active power control in accordance with certain embodiments.

FIG. 12 is a block diagram schematically showing components of a beam forming channel 408 including active power control in accordance with certain embodiments. Here, the beam forming channel 408 includes, in addition to amplitude and phase control circuitry 502, a decoder 1202 and a power controller 1204. Based on power control parameters received from the register set 406 (e.g., one or more bits in the codeword), the decoder 1202 produces a power control signal to the power controller 1204 (e.g., an on/off signal, or a power level signal), which in turn selectively controls DC power to some or all of the amplitude and phase control circuitry 502. In some embodiments the power controller 1204 may include a power switch that is controlled by the output of the decoder 1202 to turn on and off certain circuitry of the beam forming channel. In alternative embodiments, the power controller 1204 may include a digital potentiometer, digital to analog converter (DAC), or other component to control voltage and/or current provided to certain circuitry of the beam forming channel.

As discussed above, transmit path circuitry in a transmit-only or dual-mode beam forming channel 408 typically includes a power amplifier, while receive path circuitry in a receive-only or dual-mode beam forming channel 408 typically includes a low noise amplifier. The beam forming channel 408 also may include additional amplifiers and/or buffers. Given that such amplifiers and buffers typically consume a relatively large amount of DC power when enabled, the active power control discussed herein typically would include the ability to turn off such components and/or the ability to reduce the amount of DC power provided to or otherwise consumed by such components.

Importantly, in certain situations, such active power control can be used to save DC power while maintaining the full effective aperture of a beam-formed signal such that DC power can be conserved without "widening" the beam (i.e., fewer active elements generally results in a wider/fatter beam). For but one example, when the output power requirement reduces for a given beam forming channel, the DC current in the power amplifier can be reduced in that beam forming channel. In this way, all elements in the array can remain active, but overall DC power consumption can be reduced.

Figure 13:
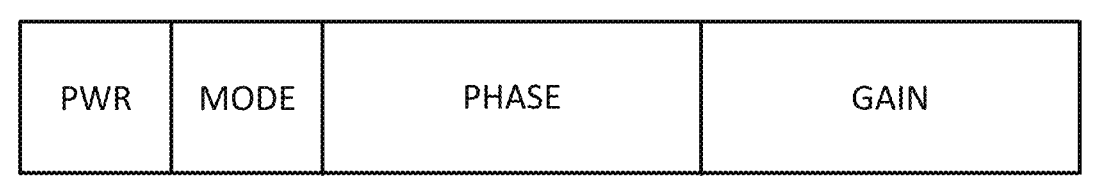

FIG. 13 schematically shows the contents of a beam forming control codeword for controlling a beam forming channel, in accordance with certain embodiments. This codeword includes a power on/off field, a mode selection field (i.e., to switch between transmit mode and receive mode for use with dual-mode elements), phase parameters, and gain/amplitude parameters. Using such a codeword, a particular beam forming channel conceivably can be switched between being enabled in transmit mode, enabled in receive mode, and disabled. When used in combination with register banks, such switching can be preprogrammed and can be accomplished at a high rate compared to conventional technologies which switch between modes more slowly and do not allow for disabling power to reduce power consumption.

Figure 14:
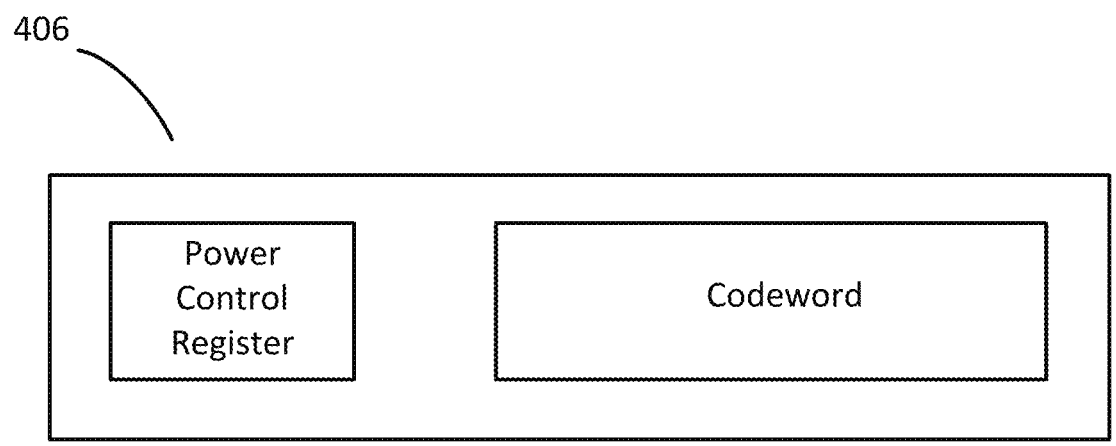
FIG. 14 schematically shows the use of a separate power control register as part of each register set, in accordance with certain exemplary embodiments.

FIG. 14 schematically shows the use of a separate power control register as part of each register set 406, in accordance with certain exemplary embodiments. Here, each register set includes power control register that is separate from the codeword register(s) used to convey gain/amplitude parameters, phase parameters, and optionally the operational mode for the beam forming channel. One possible advantage of using a separate power control register in the register sets is that the active power control circuitry may be implemented without modifying (or substantially modifying) the circuitry that uses the codeword register(s), although, when used in combination with register banks, the switching logic may need to be modified to include the power control signal.

Figure 15:
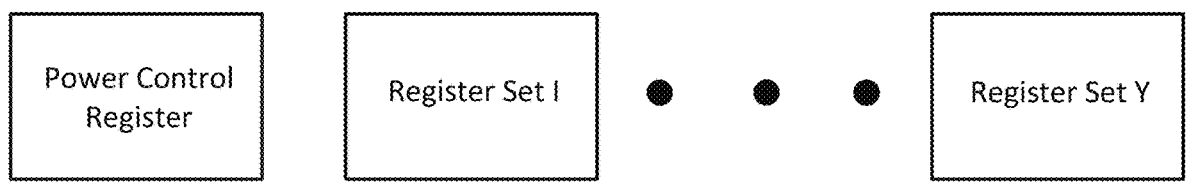
FIG. 15 schematically shows the use of a separate power control register separate from the register sets, in accordance with certain embodiments.

FIG. 15 schematically shows the use of a separate power control register separate from the register sets 406, in accordance with certain embodiments. Here, a power control register, separate from the register sets 406, is used to control power for all of the beam forming channels 408 of the beam forming ASIC 206. For example, the power control register may include Y bits, with each bit controlling power for a separate one of the beam forming channels 408, although the power control register may be encoded in other ways. One possible advantage of using a power control register separate from the register sets is that the active power control circuitry can be implemented without modifying (or substantially modifying) the circuitry that uses the register sets 406, even when used in combination with register banks (since the active power control circuitry can be implemented substantially outside of such circuitry).

The power control parameter for a beam forming channel 408 may be derived in other ways. For example, some embodiments may use the gain/amplitude parameter as an indicator of power control, e.g., disabling or reducing power to certain circuitry if the gain/amplitude is set to zero, or controlling DC power consumption of certain circuitry based on the gain/amplitude parameter.

It should be noted that, while various exemplary embodiments are described above with reference to phased array systems having a plurality of beam forming ASICs (e.g., as depicted in FIG. 2), it is conceivable for all beam forming channels and related circuitry of a phased array system to be implemented on a single beam forming ASIC or substrate and in some cases even for the entire phased array system to be implemented on a single beam forming ASIC or substrate.

Thus, using fast beam switching and/or active power control mechanisms as described herein, phased array systems can support a wide range of beam forming operations.

Figure 25:
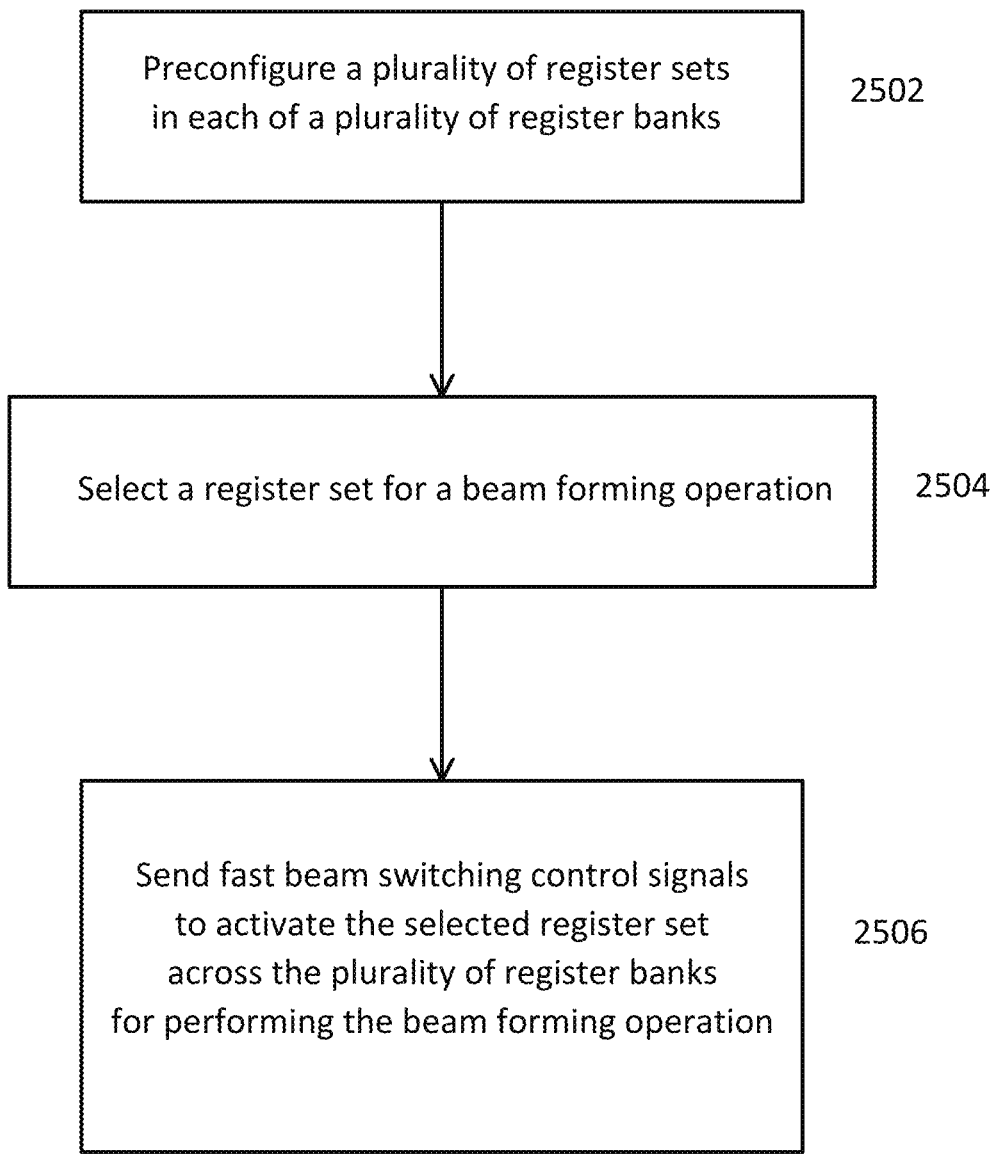
FIG. 25 is a flowchart for fast beam switching, in accordance with certain exemplary embodiments.

For example, as shown in FIG. 25, the phased array system may preconfigure a plurality of register sets in each of a plurality of register banks (block 2502), select a register set for a beam forming operation (block 2504), and send fast beam switching control signals to activate the selected register set across the plurality of register banks for performing the beam forming operation (block 2506). Of course, the phased array system may recycle from block 2506 to block 2504 to select a new register set and send fast beam switching control signals to switch to the new register set, or the phased array system may recycle from block 2506 to block 2502 to reconfigure one or more register sets.

Figure 26:
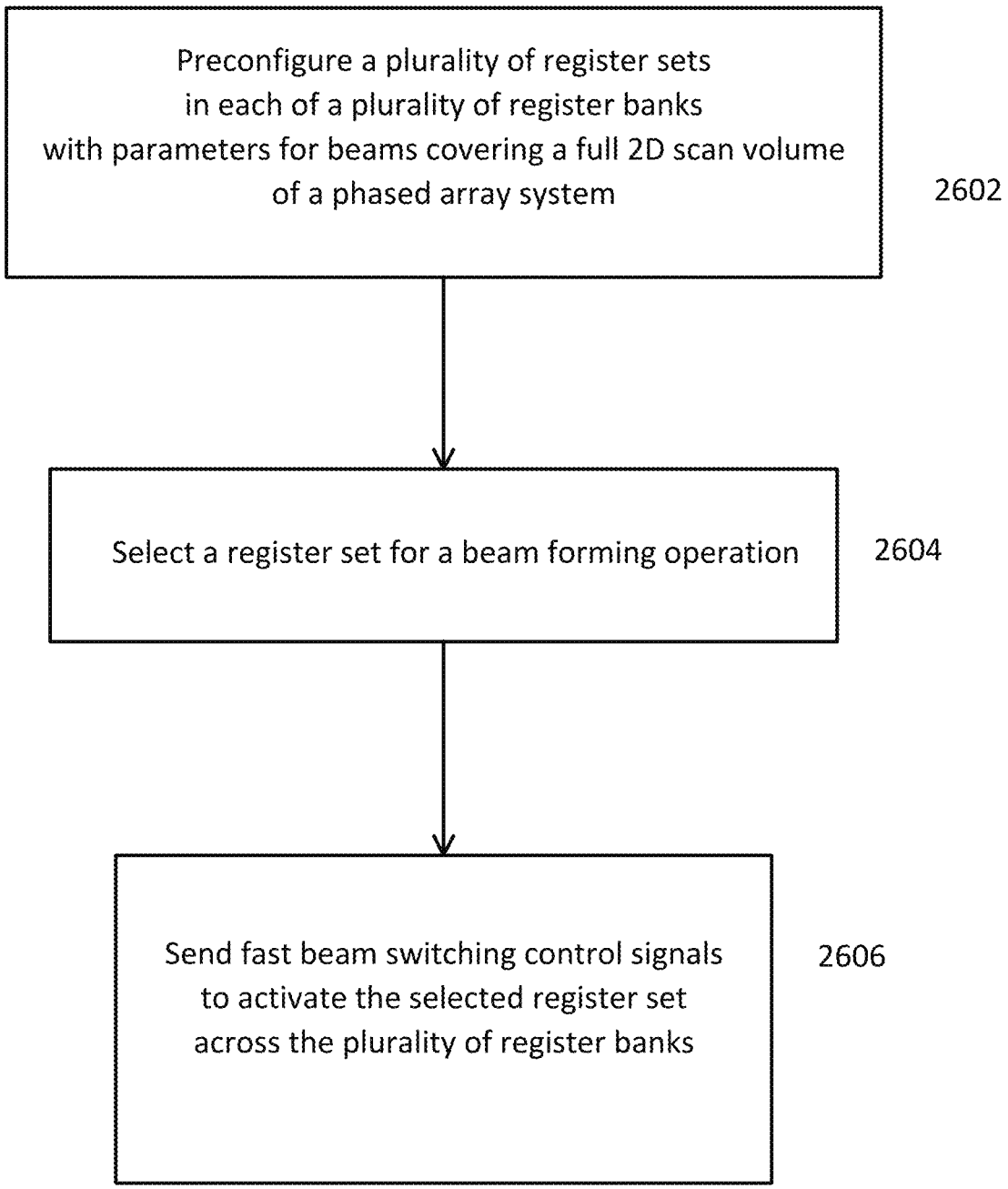
FIG. 26 is a flowchart for fast beam switching in the context of preconfiguring parameters covering a full 2D scan volume, in accordance with certain exemplary embodiments.

Additionally or alternatively, as shown in FIG. 26, the phased array system may preconfigure a plurality of register sets in each of a plurality of register banks with parameters for beams covering a full 2D scan volume of a phased array system (block 2602), select a register set for a beam forming operation (block 2604), and send fast beam switching control signals to activate the selected register set across the plurality of register banks (block 2606). Of course, the phased array system may recycle from block 2606 to block 2604 to select a new register set and send fast beam switching control signals to switch to the new register set.

Figure 27:
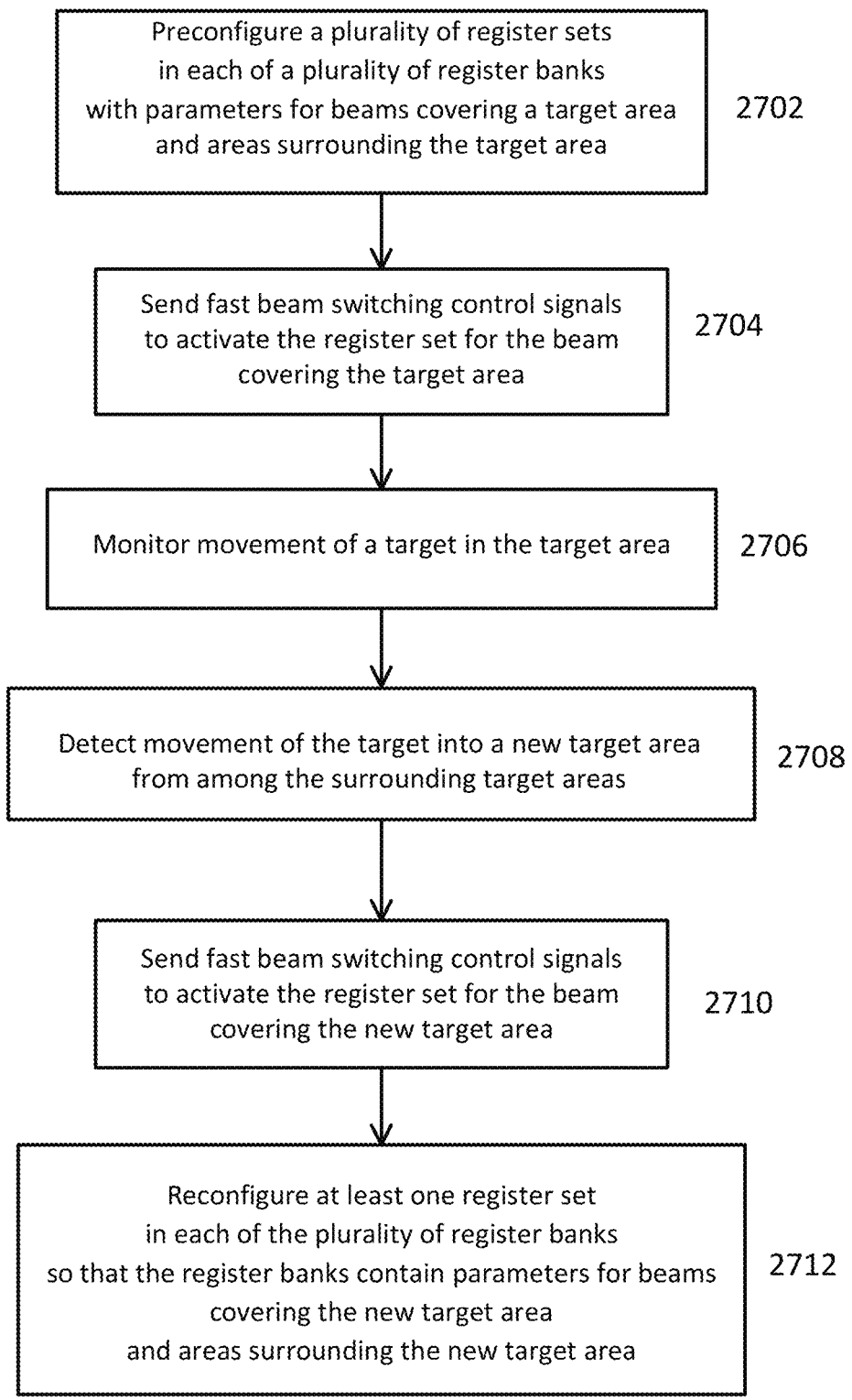
FIG. 27 is a flowchart for fast beam switching in the context of framing a target area, in accordance with certain exemplary embodiments.

Additionally or alternatively, as shown in FIG. 27, the phased array system may preconfigure a plurality of register sets in each of a plurality of register banks with parameters for beams covering a target area and areas surrounding the target area (block 2702), send fast beam switching control signals to activate the register set for the beam covering the target area (block 2704), monitor movement of a target in the target area (block 2706), detect movement of the target into a new target area from among the surrounding target areas (block 2708), send fast beam switching control signals to activate the register set for the beam covering the new target area (block 2710), and reconfigure at least one register set in each of the plurality of register banks so that the register banks contain parameters for beams covering the new target area and areas surrounding the new target area (block 2712). Of course, the phased array system may recycle from block 2712 to block 2706 to monitor movement of the target in the new target area.

Figure 28:
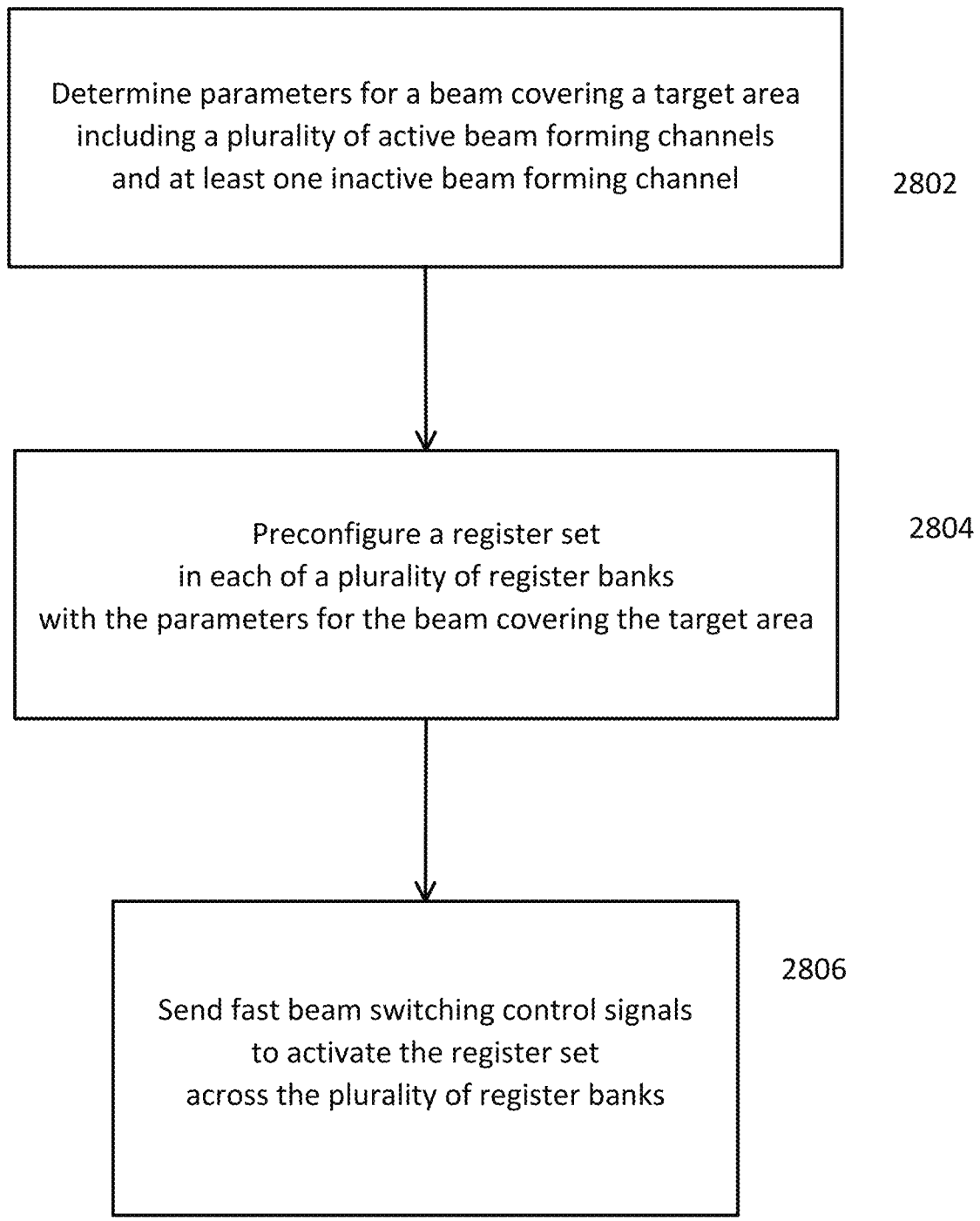
FIG. 28 is a flowchart for selectively activating and deactivating beam forming channels such as for reducing DC power consumption or to selectively change the effective directivity of the array, in accordance with certain exemplary embodiments.

Additionally or alternatively, as shown in FIG. 28, the phased array system may determine parameters for a beam covering a target area including a plurality of active beam forming channels and at least one inactive beam forming channel (block 2802), preconfigure a register set in each of a plurality of register banks with the parameters for the beam covering the target area (block 2804), and send fast beam switching control signals to activate the register set across the plurality of register banks (2806).

Of course, such phased array system may perform other beam forming operations described herein involving fast beam switching and/or active power control.

Although the above discussion discloses various exemplary embodiments of the invention, it should be apparent that those skilled in the art can make various modifications that will achieve some of the advantages of the invention without departing from the true scope of the invention.

What is claimed is:

1. A phased array system comprising:
a plurality of beam forming elements;
a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters;
a beam forming controller configured to determine a set of needed beam forming channels to be used to produce a given beam-formed signal and to provide power control parameters to selectively turn on any needed controllable beam forming channels that are off and to selectively turn off any unneeded controllable beam forming channels that are on; and
for each controllable beam forming channel, at least one operational register for providing operating parameters from the beam forming controller to the beam forming channel, wherein the power control parameters for the beam forming channels are derived from such operating parameters.

2. A phased array system according to claim 1, wherein the beam forming controller determines the needed beam forming channels to reduce DC power consumption of the phased array system.

3. A phased array system according to claim 1, wherein the beam forming controller determines the needed beam forming channels based on how signals will be combined by the phased array system.

4. A beam forming controller for use in a phased array system having a plurality of beam forming elements and a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters, the beam forming controller comprising:
 a programming interface; and
 a controller configured to determine a set of needed beam forming channels to be used to produce a given beam-formed signal and to provide power control parameters to selectively turn on any needed controllable beam forming channels that are off and to selectively turn off any unneeded controllable beam forming channels that are on, wherein the phased array system further comprises, for each controllable beam forming channel, at least one operational register for providing operating parameters from the controller to the beam forming channel, and wherein the power control parameters for the beam forming channels are derived from such operating parameters.

5. A beam forming controller according to claim 4, wherein the controller determines the needed beam forming channels to reduce DC power consumption of the phased array system.

6. A beam forming controller according to claim 4, wherein the controller determines the needed beam forming channels based on how signals will be combined by the phased array system.

7. A beam forming method for use in a phased array system having a plurality of beam forming elements and a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters, the beam forming method comprising:
 determining a set of needed beam forming channels to be used to produce a given beam-formed signal; and
 providing power control parameters to selectively turn on any needed controllable beam forming channels that are off and to selectively turn off any unneeded controllable beam forming channels that are on, wherein the phased array system further comprises, for each controllable beam forming channel, at least one operational register for providing operating parameters from the controller to the beam forming channel, and wherein the power control parameters for the beam forming channels are derived from such operating parameters.

8. A beam forming method according to claim 7, wherein the controller determines the needed beam forming channels to reduce DC power consumption of the phased array system.

9. A beam forming method according to claim 7, wherein the controller determines the needed beam forming channels based on how signals will be combined by the phased array system.

10. A phased array system comprising:
 a plurality of beam forming elements;
 a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters;
 a beam forming controller configured to determine a set of needed beam forming channels to be used to produce a given beam-formed signal and to provide power control parameters to selectively turn on any needed controllable beam forming channels that are off and to selectively turn off any unneeded controllable beam forming channels that are on; and
 for each controllable beam forming channel, at least one operational register for providing operating parameters from the beam forming controller to the beam forming channel and at least one power control register, separate from the at least one operational register, for providing the power control parameters for the beam forming channel.

11. A phased array system according to claim 10, wherein the beam forming controller determines the needed beam forming channels to reduce DC power consumption of the phased array system.

12. A phased array system according to claim 10, wherein the beam forming controller determines the needed beam forming channels based on how signals will be combined by the phased array system.

13. A beam forming controller for use in a phased array system having a plurality of beam forming elements and a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters, the beam forming controller comprising:
 a programming interface; and
 a controller configured to determine a set of needed beam forming channels to be used to produce a given beam-formed signal and to provide power control parameters to selectively turn on any needed controllable beam forming channels that are off and to selectively turn off any unneeded controllable beam forming channels that are on, wherein the phased array system further comprises, for each controllable beam forming channel, at least one operational register for providing operating parameters from the beam forming controller to the beam forming channel and at least one power control register, separate from the at least one operational register, for providing the power control parameters for the beam forming channel.

14. A beam forming controller according to claim 13, wherein the controller determines the needed beam forming channels to reduce DC power consumption of the phased array system.

15. A beam forming controller according to claim 13, wherein the controller determines the needed beam forming channels based on how signals will be combined by the phased array system.

16. A beam forming method for use in a phased array system having a plurality of beam forming elements and a plurality of beam forming channels, each beam forming channel including beam forming circuitry configured to process signals for a discrete beam forming element, wherein at least some of the beam forming channels are controllable to turn the beam forming channel on and off, and wherein each controllable beam forming channel comprises active power control circuitry to turn the controllable beam forming channel on and off based on power control parameters, the beam forming method comprising:

determining a set of needed beam forming channels to be used to produce a given beam-formed signal; and providing power control parameters to selectively turn on any needed controllable beam forming channels that are off and to selectively turn off any unneeded controllable beam forming channels that are on, wherein the phased array system further comprises, for each controllable beam forming channel, at least one operational register for providing operating parameters from the beam forming controller to the beam forming channel and at least one power control register, separate from the at least one operational register, for providing power control parameters for the beam forming channel.

17. A beam forming method according to claim 16, wherein the controller determines the needed beam forming channels to reduce DC power consumption of the phased array system.

18. A beam forming method according to claim 16, wherein the controller determines the needed beam forming channels based on how signals will be combined by the phased array system.

* * * * *